(12) United States Patent
Rekapalli

(10) Patent No.: US 10,983,561 B2
(45) Date of Patent: Apr. 20, 2021

(54) METHOD FOR MANAGING FLEXIBLE DISPLAY AND ELECTRONIC DEVICE THEREOF

(71) Applicant: Samsung Electronics Co., Ltd., Suwon-si (KR)

(72) Inventor: Phani Avadooth Rekapalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/456,731

(22) Filed: Jun. 28, 2019

(65) Prior Publication Data

US 2020/0004297 A1 Jan. 2, 2020

(30) Foreign Application Priority Data

Jun. 29, 2018 (IN) .............................. 201841024286
Oct. 31, 2018 (IN) ............................ 2018 41024286
Jun. 28, 2019 (KR) ........................ 10-2019-0077983

(51) Int. Cl.
*G06F 1/16* (2006.01)
*H04M 1/02* (2006.01)
*G06F 3/147* (2006.01)

(52) U.S. Cl.
CPC .......... *G06F 1/1652* (2013.01); *G06F 1/1618* (2013.01); *G06F 3/147* (2013.01); *H04M 1/0268* (2013.01)

(58) Field of Classification Search
None
See application file for complete search history.

(56) References Cited

U.S. PATENT DOCUMENTS

| 2013/0229324 A1 | 9/2013 | Zhang et al. |
| 2013/0265257 A1 | 10/2013 | Jung et al. |
| 2014/0015743 A1* | 1/2014 | Seo ........................ G06F 3/0481 345/156 |
| 2014/0285476 A1* | 9/2014 | Cho ..................... H04M 1/0268 345/204 |
| 2016/0184700 A1 | 6/2016 | Lee et al. |

(Continued)

FOREIGN PATENT DOCUMENTS

| EP | 2 842 013 A1 | 3/2015 |
| KR | 10-2015-0099221 A | 8/2015 |

(Continued)

OTHER PUBLICATIONS

Creating Photographs Using Deep Learning_Two Minute Papers #13—YouTube, Oct. 3, 2015, https://www.youtube.com/watch?v=HOLoPgTzV6g.

(Continued)

*Primary Examiner* — Christopher J Kohlman
(74) *Attorney, Agent, or Firm* — Jefferson IP Law, LLP

(57) ABSTRACT

The methods and systems for managing a flexible display of an electronic device are provided. The method includes receiving an input for folding a flexible display of the electronic device, identifying a state of the electronic device by using at least one sensor of the electronic device, identifying whether the flexible display is capable of being folded according to the identified state of the electronic device, and if it is identified that the flexible display is capable of being folded, controlling to fold the flexible display.

20 Claims, 35 Drawing Sheets

(56) References Cited

U.S. PATENT DOCUMENTS

| | | | |
|---|---|---|---|
| 2016/0187122 A1* | 6/2016 | Krimon | G06F 1/1684 |
| | | | 340/679 |
| 2016/0380703 A1 | 12/2016 | Konanur et al. | |
| 2017/0038800 A1* | 2/2017 | Xu | G06F 1/1679 |
| 2017/0075559 A1 | 3/2017 | Jung et al. | |
| 2017/0185289 A1 | 6/2017 | Kim et al. | |

FOREIGN PATENT DOCUMENTS

| | | |
|---|---|---|
| KR | 10-2017-0077434 A | 7/2017 |
| WO | 2013/162783 A1 | 10/2013 |

OTHER PUBLICATIONS

Printed Paper Actuator: A Low-cost Reversible Actuation and Sensing Method for Shape Changing . . .—YouTube, Apr. 7, 2018, https://youtu.be/MZgSQwAqepU.
Shape-memory alloy—Wikipedia, https://en.wikipedia.org/wiki/Shape-memory_alloy.
Flexible—E Ink, https://eink.com/flexible-technology.html.
Flexion—SensorWiki, https://sensorwiki.org/sensors/flexion.
International Search Report and Written Opinion dated Oct. 8, 2019, issued in International Patent Application No. PCT/KR2019/007903.
Indian Office Action dated Mar. 11, 2021, issued in Indian Application No. 201841024286.

* cited by examiner

METHOD FOR MANAGING FLEXIBLE DISPLAY AND ELECTRONIC DEVICE THEREOF

CROSS-REFERENCE TO RELATED APPLICATION(S)

This application is based on and claims priority under 35 U.S.C. § 119(a) of an Indian provisional application number 201841024286, filed on Jun. 29, 2018 and Indian complete application number 201841024286, filed on Oct. 31, 2018, filed in the Indian Intellectual Property Office, and Korean Patent Application No. 10-2019-0077983, filed on Jun. 28, 2019, in the Korean Intellectual Property Office, the disclosures of each of which are incorporated by reference herein in their entirety.

BACKGROUND

1. Field

The disclosure relates to electronic devices with a flexible display. More particularly, the disclosure relates to managing a flexible display of an electronic device for satisfying intent of a user.

2. Description of Related Art

Currently, devices with flexible displays are being developed. For example, the flexible display may be formed by replacing a glass substrate that surrounds a liquid crystal of a liquid crystal display (LCD) and an organic light-emitting diode (OLED) with a plastic film, thereby adding flexibility to allow for folding and unfolding.

In various approaches, the flexible display can be folded/altered such that their configuration, size and length are changed by external forces while being able to display content in the various configurations. However, position of objects present in the content may not altered while folding the flexible displays. A user may have difficulty in interacting with the objects present in the content displayed on folded areas of the flexible display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure provide a method and an electronic device for managing a flexible display.

Embodiments of the disclosure provide a method and an electronic device for determining fold state configurations for managing the flexible display.

Embodiments of the disclosure provide a method and an electronic device for determining user intent with respect to content being displayed on the flexible display or content being rendered/fetched for being displayed on the flexible display to determine the fold state configurations.

Embodiments of the disclosure provide a method and an electronic device for altering the content being displayed on the flexible display or content being rendered/fetched for being displayed on the flexible display according to the fold state configurations.

Additional aspects will be set forth in part in the description which follows and, in part, will be apparent from the description, or may be learned by practice of the presented embodiments.

In accordance with an embodiment of the disclosure, a method for operating an electronic device is provided. The method includes detecting an input for folding a flexible display of the electronic device based on a sensor of the electronic device, identifying that the flexible display is capable of being folded based on a state of the electronic device obtained based on the detected input, determining a fold state configuration for the flexible display based upon identifying that the flexible display is capable of being folded, controlling to fold the flexible display according to the determined fold state configuration, and displaying a content on the folded flexible display.

In accordance with an embodiment of the disclosure, an electronic device is provided. The electronic device includes at least one sensor, a flexible display, and at least one processor. The at least one processor is configured to control to detect an input for folding the flexible display based on the at least one sensor, identify that the flexible display is capable of being folded based on a state of the electronic device obtained based on the detected input, determine a fold state configuration for the flexible display based upon identifying that the flexible display is capable of being folded, fold the flexible display according to the determined fold state configuration, and display a content on the folded flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
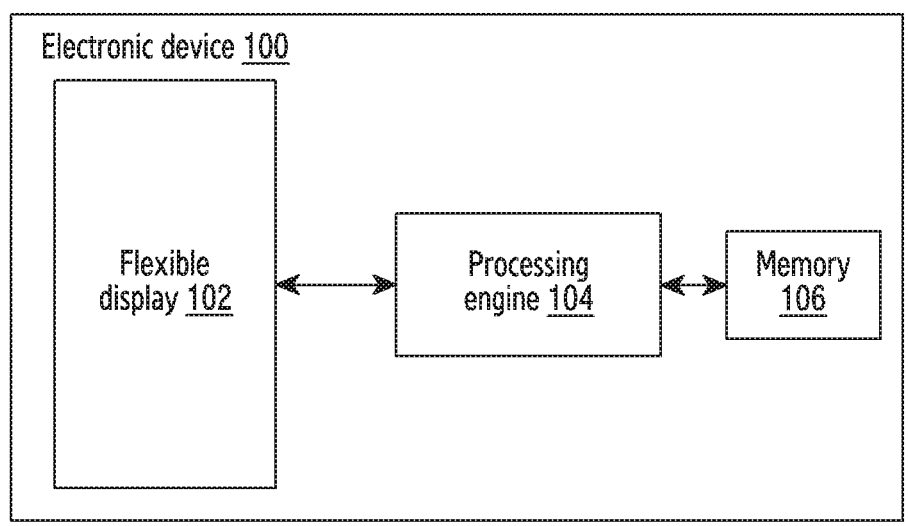
FIG. 1 illustrates an electronic device for managing a flexible display, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein disclose methods and systems for managing a flexible display of an electronic device. Referring now to the drawings, and more particularly to FIGS. 1 through 12K, where similar reference characters denote corresponding features consistently throughout the figures, there are shown example embodiments.

FIG. 1 illustrates an electronic device for managing a flexible display, according to embodiments of the disclosure.

Referring to FIG. 1, the electronic device 100 herein refers to a device comprising at least one flexible display 102 for displaying content. Examples of the electronic device 100 can be, but is not limited to, a mobile phone, a smartphone, tablet, a phablet, a personal digital assistant (PDA), a laptop, an electronic reader, a wearable device, an internet of things (IoT) device, a wearable computing device, a vehicle infotainment system, a medical device, a television (TV), a vehicle display, a gaming device, a kiosk and so on. Examples of the content as referred to herein can be at least one of, but not limited to, a media (an image, a video, an animation, and so on), text, a remainder, an application (a calendar application, a weather application, a sports application, a news application and so on), an icon (call in progress, received messages, timer ticking and so on), a ticker, a widget, an advertisement and so on.

Figure 4A:
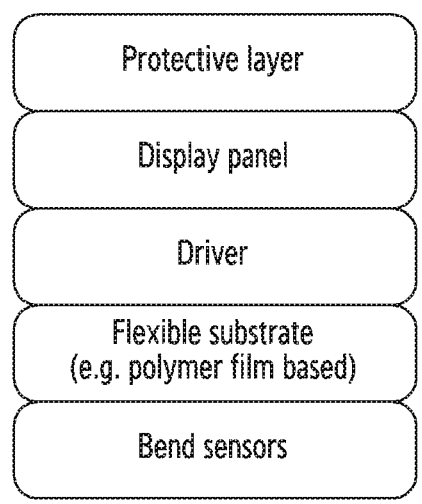
FIGS. 4A, 4B, 4C, 4D, and 4E illustrate example structures of a flexible display of an electronic device, according to embodiments of the disclosure.

The flexible display 102 herein refers to a display which can be bent or folded or rolled while having display characteristics of an existing flat panel display apparatus. The flexible display 102 may include bend sensors, actuators, a flexible substrate, a driver, a display panel and a protective layer (as illustrated in FIG. 4A). In an embodiment, the bend sensors and the actuators can be used to achieve folding/bending of the flexible display 102. In another embodiment, the flexible display 102 may be embodied as an electronic paper (general characteristics of ink may be applied to the electronic paper and the electronic paper uses reflected light to display the content). The electronic paper may change the content using electrophoresis using a twist ball or capsule.

The electronic device 100 further includes a processing engine 104 and a memory 106. The processing engine 104 can be coupled to the flexible display 102 and can comprise at least one processer, a plurality of processors, multiple homogenous cores, multiple heterogeneous cores, multiple central processing unit (CPUs) of different kinds and so on.

Figure 6A:
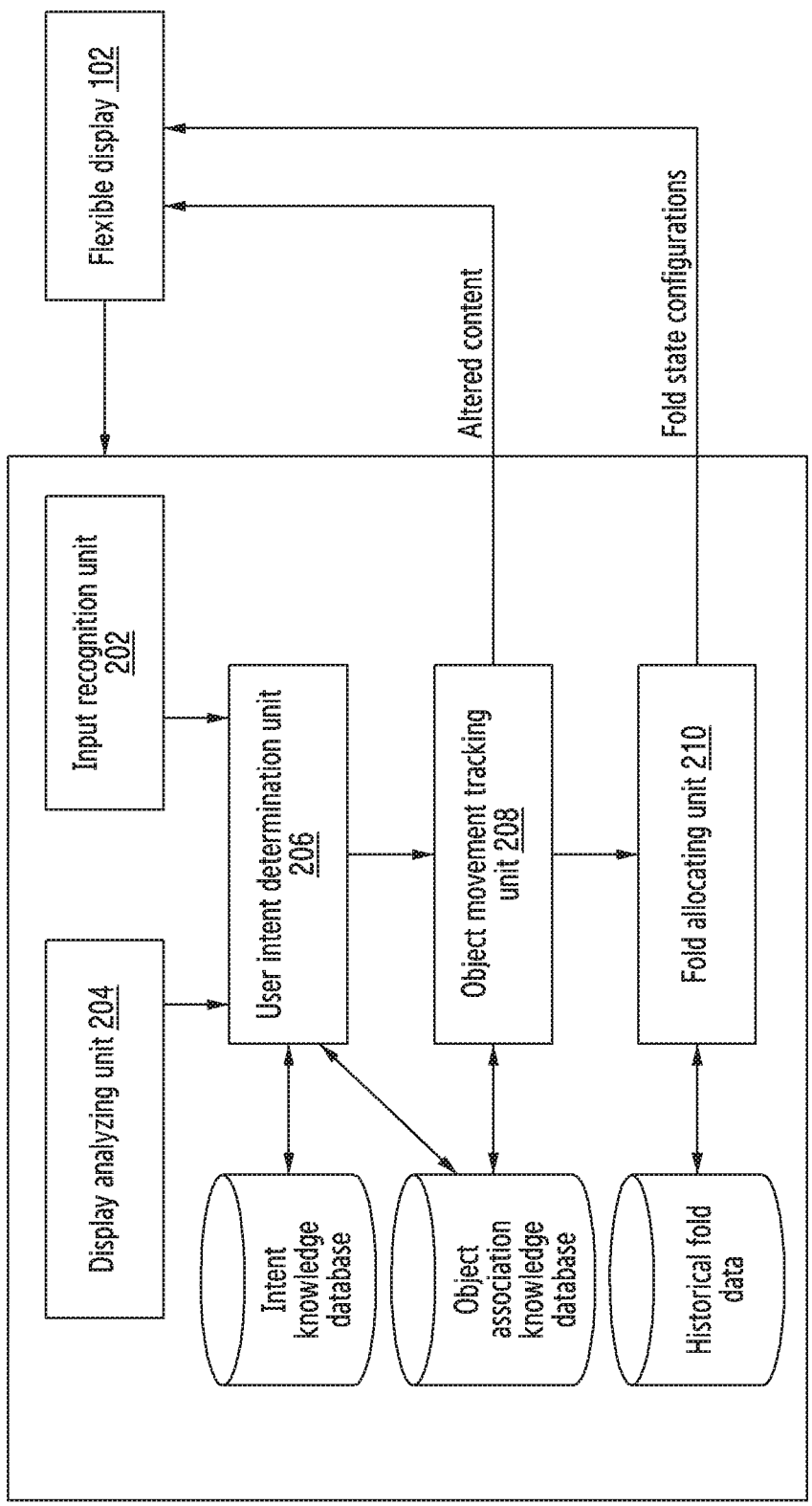
FIG. 6A illustrates units of a processing engine for determining fold state configurations for a flexible display, according to an embodiment of the disclosure.

The electronic device 100 may be coupled with at least one sensor for recording user inputs, a state of the flexible display and/or physical characteristics of the flexible display, and so on. The sensor can be, but is not limited to, a gyroscope, an accelerometer, a gravity sensor, a proximity sensor, an angular velocity sensor, a strain gauge sensor, a visual sensor (camera, iris scanner and so on), an audio sensor (a microphone), an inertial sensor, and so on. The electronic device 100 may also access data from databases, such as an intent knowledge database, an object association knowledge database, a database comprising previous/historical configurations and so on, as illustrated in FIG. 6A, which is required for managing the flexible display 102. The electronic device 100 may further connect to a server (not shown) using at least one of the Internet, a wired network (a local area network (LAN), Ethernet and so on), a wireless network (a Wi-Fi network, a cellular network, a Wi-Fi Hotspot, Bluetooth, Zigbee and so on) or the like for downloading the content and accessing information required for managing the flexible display 102.

The processing engine 104 can be configured to manage the flexible display 102 in response to recognizing the user inputs. The user inputs can include at least one of interactions of a user with the electronic device 100, user commands and so on. On recognizing the user inputs, the processing engine 104 detects the content displayed on the flexible display in relation to a current state of the flexible display 102. Further, the processing engine 104 determines the user intent with respect to the content using at least one of user inputs, the content displayed on the flexible display 102 and so on. Based on the user intent with respect to the content, the processing engine 104 determines fold state configurations for the flexible display 102. According to the determined fold state configurations, the processing engine 104 performs physical folding of the flexible display 102. In addition, the content being displayed on the flexible display 102 or content being rendered/fetched for being displayed on the flexible display 102 can be altered according to the fold state configurations for satisfying the user intent.

The processing engine 104 may be further configured to detect the objects present in the content being displayed on the flexible display 102. Further, the processing engine 104 recognizes the object(s) having directional property relative to the current state/physical characteristic (including a foldable area) of the flexible display 102. On receiving the user input, the processing engine 104 folds the flexible display to display the object(s) having the directional property relative to the current state on the foldable area of the flexible display 102. The flexible display 102 can be folded based on the current state of the flexible display 102 and the user intent determined from the user input. In addition, the foldable area of the flexible display 102 can be extended to any segment of the flexible display 102 for displaying any other object(s) on the extended foldable area of the flexible display 102, wherein any other object(s) is associated with the object(s) displayed on the foldable area of the flexible display 102.

The processing engine 104 may be further configured to detect a first content (e.g., a video) being displayed on the flexible display 102 in relation to the current state of the flexible display 102. Further, the processing engine 104 may receive the user input for a second content (e.g., a weather update). On receiving the user input, the processing engine 104 folds the flexible display 102 based on the current state of the flexible display 102 and the user intent determined from the user input. The flexible display 102 can be folded to display either the first content or the second content on the foldable area of the flexible display 102. Further, the processing engine 104 can display a third content on the foldable area of the flexible display 102, wherein the third content can be associated with at least one of the first content and the second content. In addition, the processing engine 104 can extend the foldable area to any segment of the flexible display 102 for displaying at least one of the first content, the second content and the third content on the extended foldable area of the flexible display 102.

The memory 106 can be configured to store the user inputs, the user intent, the content, the fold state configurations, and so on. The memory 106 may include one or more computer-readable storage media. The memory 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 106 may, in some examples, be considered as a non-transitory storage medium. The term "non-transitory" may indicate that the storage medium is not embodied in a carrier wave or a propagated signal. However, the term "non-transitory" should not be interpreted to mean that the memory 106 is non-movable. In some examples, the memory 106 can be configured to store larger amounts of information than the memory. In certain examples, a non-transitory storage medium may store data that can, over time, change (e.g., in random access memory (RAM) or cache).

FIG. 1 shows various units of the electronic device 100, but it is to be understood that other embodiments are not limited thereon. In other embodiments, the electronic device 100 may include less or more number of units. Further, the labels or names of the units are used only for illustrative purpose and does not limit the scope of the embodiments herein. One or more units can be combined together to perform same or substantially similar function in the electronic device 100.

Figure 2:
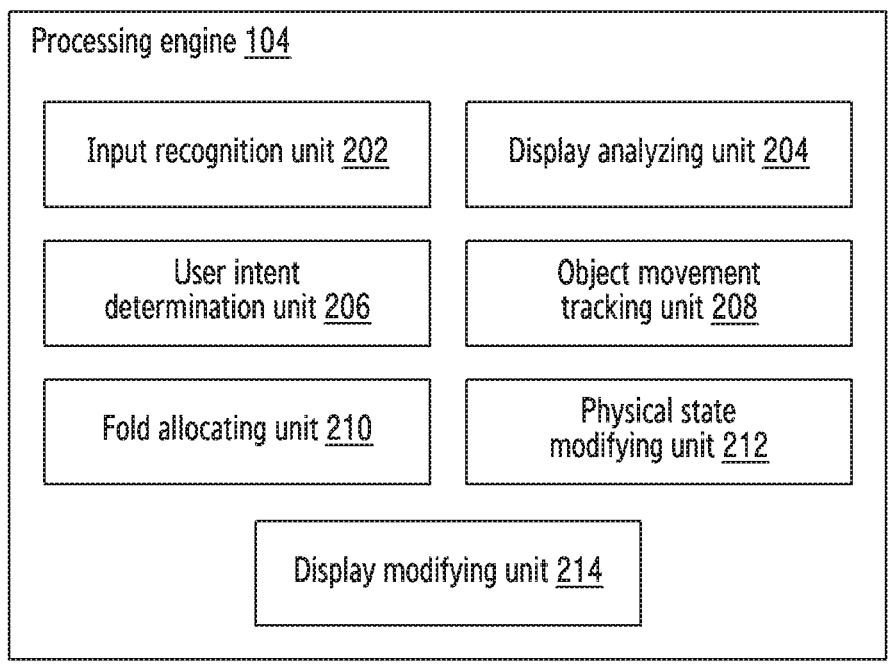
FIG. 2 illustrates a block diagram of a processing engine for determining fold state configurations to manage the flexible display, according to an embodiment of the disclosure.

FIG. 2 illustrates a block diagram of the processing engine for determining the fold state configurations to manage the flexible display according to an embodiment of the disclosure.

Referring to FIG. 2, the processing engine 104 includes an input recognition unit 202, a display analyzing unit 204, a user intent determination unit 206, an object movement tracking unit 208, a fold allocating unit 210, a physical state modifying unit 212 and a display modifying unit 214.

The input recognition unit 202 can be configured to recognize the user inputs. The user inputs can include at least one of the interactions of the user with the electronic device 100, the user commands and so on. The interactions of the user with electronic device 100 can be, but is not limited to, bending of the electronic device 100, user gaze position with respect to the electronic device 100, user proximity for the electronic device 100, view angle for the electronic device 100, and so on. In an embodiment, the input processing unit 202 identifies the interactions of the user with the electronic device 100 using at least one display sensor. The display sensor can be, but is not limited to, a gyroscope, an accelerometer, a light sensor, a camera, a proximity sensor or any other visual sensors. The user commands can be, but are not limited to, voice commands, utterance and so on for bending and/or folding the flexible display 102 with respect to the content being displayed on the flexible display 102 or content being rendered and/or fetched for being displayed on the flexible display 102. The input recognition unit 202 may determine the user commands using at least one audio sensor (a microphone), a touchscreen (which can be the same as the foldable display), one or more switches, and so on. The input recognition unit 202 provides the recognized user inputs to the display analyzing unit 204 and the user intent determination unit 206.

The display analyzing unit 204 can be configured to determine the state and/or physical characteristics of the flexible display 102 on recognizing the user inputs. The state of the flexible display 102 may indicate physical properties of the flexible display 102, such as an orientation of flexible display surface, a fold state, a location of fold and/or foldable area, an angle, a folding line, a type, a size, a weight, a location of the flexible display surface with the electronic device 100 and so on. The display analyzing unit 204 may determine the state of the flexible display using at least one sensor such as, but not limited to, a gravity sensor, a bend sensor, an accelerometer, an angular velocity sensor, a strain gauge sensor, a gyroscope, an inertial sensor, and so on.

The display analyzing unit 204 may determine the content being displayed on the flexible display 102 or content being rendered and/or fetched for being displayed on the flexible display 102, in relation to the determined state of the flexible display 102. The display analyzing unit 204 also determines objects of content being displayed on the flexible display 102 or content being rendered and/or fetched for being displayed on the flexible display 102, positions of the objects on the flexible display 102, and relation between the objects. The objects herein refer to virtual objects present in the content. Examples of the objects can be, but is not limited to, a box, a roller, check box, a button, scrolling/running content (alpha numeric characters, video clips. scrolling text or the like) and so on.

The display analyzing unit 204 may use at least one deep neural network model (a convolutional neural network (CNN) model or the like) to identify the objects present in the content, the positions of the objects and the relation between the objects. Embodiments herein are further explained considering using the CNN as an example deep neural network model for identifying the objects present in the content, the positions of the objects and the relation between the objects, but it may be obvious to a person of ordinary skill in the art that any other form of deep neural network models can be used. The display analyzing unit 204 feeds the content being displayed on the flexible display 102 or content being rendered and/or fetched for being displayed on the flexible display 102 to the CNN model. The CNN model comprises convolutional layers, fully connected (FC) layers and a soft-max layer for determining the objects present in the content and relation between the objects. Also, the CNN model performs approximate max-pooling over the feature channel maps of the content (generated by the convolutional layers) to determine the position and/or location of the objects on the flexible display 102. The display analyzing unit 204 feeds the state of the flexible display 102, the determined content, the objects present in the content, the relation between the objects and the position of the objects present in the content to the user intent determination unit 206.

The user intent determination unit 206 can be configured to determine the user intent with respect to the content displayed on the flexible display. For example, the user intent may associate with movement/sliding of certain objects present in the content on the flexible display 102. The user intent determination unit 206 processes the recognized user inputs using a suitable technique to understand context associated with the user inputs. The user intent determination unit 206 may use natural language processing (NLP) techniques to process the user commands. The user intent determination unit 206 uses a deep neural network model to process the recognized interactions of the user with the electronic device 100. On receiving the user inputs from the input recognition unit 202, the user intent determination unit 206 may start multimodal interaction with the user by generating and providing natural language alerts or responses to the user for receiving the inputs from the user. The received inputs may be used as feedback mechanism to determine the context associated with the user inputs.

Further, the user intent determination unit 206 identifies the context information associated with the user from the electronic device 100. The context information can include at least one of the activity of the user (usage of the electronic device 100), information about location of the electronic device 100, information about time and so on. Based on the processed user inputs and the context information, the user intent determination unit 206 determines the user intent. The user intent determination unit 206 may access the intent knowledge database/context builder to determine the user intent for the recognized at least one of the interactions of the user and the user commands. The intent knowledge database may include information about the user inputs and the corresponding user intent.

The user intent determination unit 206 can be further configured to associate the determined user intent with the objects present in the content being displayed on the flexible display 102 or content being rendered/fetched for being displayed on the flexible display 102. The user intent determination unit 206 may access the object knowledge database to associate the user intent with the objects present in the content. The object knowledge database may include information about the user intent and the related objects.

The object movement tracking unit 208 can be configured to determine a change in a directional property of the object(s) of the content associated with the user intent. The determined change in the directional property of the object(s) refers to a path of change or a change in a path of movement of the object(s) to satisfy the user intent. The object movement tracking unit 208 can use at least one of a neural network model to determine the change in the directional property of the object(s) of the content. Further, the neural network model determines indicia for the object(s), wherein the indicia can be overlaid on the object(s) and the indicia indicate the path in which the object(s) to be moved on the flexible display (102) in order to satisfy the user intent.

The neural network model determines the path of the object(s)/directional property of the object(s) based on factors, such as the physical characteristics of the object(s), a shape of the flexible display 102, and so on. The physical characteristics of the object(s) can be, but not limited to, a shape, an orientation, a size, a type, a weight, a sliding property (movement) of the object(s), color, and so on. The sliding property of the object(s) indicates a movement of the object(s) on at least one type of surface associated with the flexible display. The surface associated with the flexible display 102 can be, but not limited to, a linear surface, a slant surface, a smooth surface, a frictional surface, rough surface and so on. The neural network model determines the change in the directional property of the object(s) by determining slanted angle, current orientation of the object(s) in relation with the determined path of the object(s). For example, the change in the directional property of a box may be determined as to slide/move in the direction of a slide/fold and the change in the directional property of a roller may be determined as to roll in the direction of the slide/fold.

For example, the object movement tracking unit 208 may recognize the movement of the object(s) along a first direction based on the user intent. The first direction indicates a direction along which the object(s) can be moved or slide to satisfy the user intent. Examples of the first direction can be, but is not limited to, upwards, backwards, sideways (along left side or along right side), downwards, zooming in/out and so on. Consider a scenario, wherein the user intent determined from voice commands of the user is "reach left basket". Then, the object movement tracking unit 208 determines the movement of the at least one object along a left side to satisfy the user intent.

The fold allocating unit 210 can be configured to determine the fold state configurations to demonstrate the determined change in the directional property of the object(s) by folding the flexible display 102.

Before determining the fold state configurations for the flexible display 102, the fold allocating unit 210 may determine a folding mode associated with the flexible display 102 of the electronic device 100. The folding mode can be at least one of a semiautomatic folding mode, an automatic folding mode, a manual folding mode, and so on. On determining the activation of the semiautomatic folding mode of the flexible display 102, the folding allocating unit 210 obtains information about pre-defined folding areas to determine the fold state configurations. On determining the activation of the automatic folding mode of the flexible display 102, the fold allocating unit 210 identifies a state of the electronic device 100. The state of the electronic device 100 includes information about a positioning of the electronic device 100, a holding state of the electronic device 100, usage of the electronic device 100 and so on. The positioning of the electronic device 100 is identified based on the current position of the electronic device 100 in at least one of an open location or a closed location (e.g., in a bag, a container, on a desk, in the hands of a person, and so on). The holding state of the electronic device 100 includes information about how the user is holding the electronic device 100. For example, user holding the electronic device 100 using single hand, user holding the electronic device 100 using two hands, user holding the electronic device 100 tightly and so on. The usage of the electronic device 100 identifies that the electronic device 100 is being used while driving, exercising, charging and so on. In an embodiment, the fold allocating unit 210 determines the state of the electronic device 100 using sensor data such as, but not limited to, accelerometer data, gyroscope data, position of human hold, user gaze position, flexible display state, proximity, viewing angle, light sensor data and so on.

The fold allocating unit 210 determines availability of a degree of freedom for the determined state of the electronic device 100. The degree of freedom indicates a possible movement of the electronic device 100 with respect to the determined state of the electronic device 100. On determining that the determined state may not allow folding the flexible display 102, the fold allocating unit 210 generates alerts to the user indicating impossibility of performing the folding of the flexible display 102 for the determined state. The alerts can be, but is not limited to, an audio alert, a visual alert, a Natural Language alert and so on.

On determining the availability of the degree of freedom, the fold allocating unit 210 uses a deep neural network model to determine the fold state configurations. It should be noted that embodiments herein may use any form of neural networks to determine the fold state configurations. The deep neural network model determines the physical characteristics of the object(s) associated with the user intent. The physical characteristics of the object(s) can be, but is not limited to, a shape, an orientation, a size, a type, a weight, a sliding property (movement) of the object(s), color, and so on. The sliding property of the object(s) indicates a movement of the object(s) on at least one type of surface associated with the flexible display. The surface associated with the flexible display 102 can be, but not limited to, a linear surface, a slant surface, a smooth surface, a frictional surface, rough surface and so on. In an embodiment, the fold allocating unit 210 accesses the object knowledge database to determine the physical characteristics of the object(s). The object database may include information about the physical characteristics of each object of the content being displayed on the flexible display 102 or content being rendered/fetched for being displayed on the flexible display 102.

Once the physical characteristics of the object(s) are identified, the deep neural network model associates the physical characteristics of the object(s), and the determined change in the directional property of the object(s) with the determined state of the flexible display 102. The deep neural network model determines the fold state configurations by identifying the change required in the state of the flexible display to demonstrate the determined change in the directional property of the object(s). The fold state configurations may determine the change required in the current state of the flexible display 102 such as, but not limited to, a location on the flexible display/folding area, folding lines of the folding area, a number of folds, a bending speed, an angle of fold, and so on at which the directional property of the object can be demonstrated by satisfying the user intent.

For determining the fold state configurations, the fold allocating unit 210 receives information from the display analyzing unit 204 about the type of the object(s) associated with the user intent and the location placed on the flexible display 102. Based on the received information, the fold allocating unit 210 determines the orientation of the object(s) with respect to the flexible display 102. The orientation indicates an angle made with a base (the flexible display 102) for 3 axes. The fold allocating unit 210 determines an angle of movement and corresponding position co-ordinates required to demonstrate the change in the directional property of the object(s) based on the user intent. The angle of movement and corresponding position co-ordinates can be determined with respect to the current path of movement of the object(s). After calculating the change in the angle of movement, the fold allocating unit 210 determines the foldable area/folding location as a function of the current location of the object(s) on the flexible display 102, the determined position co-ordinates to demonstrate the change in the directional property of the object(s) (future position co-ordinates), the determined angle of movement to demonstrate the change in the directional property of the object(s) (future angle of movement), the determined current orientation/angle, the current position of the object(s) and the future position of the object(s) determined to demonstrate the change in the directional property of the object(s) in a three dimensional space and environment like air, ground, water, friction and so on. The determined folding location can be represented as:

Folding location (x,y,z)=Function (destination, source, angles, environment conditions). Consider an example scenario, wherein the user intent can be determined as rolling of the object to the left. Based on the user intent, the fold allocating unit 210 decides to perform linear vertical fold at (x-1, y, z) in case of orientation of the object at (x, y) is flat on the surface of the flexible display 102. Further, the future position is being moved straight to left (x-4, y) while z co-ordinate (depth) can be updated based on the physical fold.

Once the folding location is determined, the fold allocating unit 210 calculates a fold angle change set to achieve the determined change in the directional property/path of movement of the object(s). For example, the fold angle change set may be calculated as {15 degrees, 30 degrees, 45 degrees). According to the fold angle change set, the state of flexible display 102 may be changed to first angle (15 degrees) due to the slant surface created virtually for the object(s). Subsequent positions can be calculated based on a virtual gravity condition (for example: for a triangle made by 15 degrees, the next position may be calculated as to move across the hypotenuse). In addition, the fold allocating unit 210 enables refreshing of the flexible display 102 since the fold angle increases. The user gets synchronized view of the object(s) sliding due to the fold until the final future location is reached.

The fold allocating unit 210 may access the memory 106 or the database to obtain the previous/historical fold state configurations determined for satisfying the similar user intent. The fold allocating unit 210 may use the obtained previous/historical fold state configurations to demonstrate the determined change in the directional property of the objects present in the content. The fold allocating unit 210 feeds the determined fold state configurations to the physical state modifying unit 212 and the display modifying unit 214.

The physical state modifying unit 212 can be configured to generate a suitable electrical signal (voltage) for performing the folding of the flexible display 102. The electrical signal may represent the fold state configurations determined for the flexible display 102. The physical state modifying unit 210 provides the suitable voltage to the actuators associated with the flexible display 102. The actuators control the bend sensors of the flexible display 102 for folding the flexible display 102 according to the fold state configurations. The folding of the flexible display 102 may allow the object(s) to move along the determined direction by satisfying the user intent. Thus, the flexible display 102 can be folded by detecting changes in at least one of the movement of objects present in the content and the state of the flexible display 102.

The display modifying unit 214 can be configured to alter the content being displayed on the flexible display 102 or content being rendered/fetched for being displayed on the flexible display 102 according to the fold state configurations. The display modifying unit 214 determines whether the object(s) is displayed within a set range (the set range may be in units of a pixel, a length, an area and so on) from the folding line associated with the foldable area. On determining that the object(s) is displayed within the set range from the folding line, the display modifying unit 214 modifies the object displayed on the flexible display 102. The display modifying unit 214 may change a location/position of the object(s), a size of the object(s) and so on according to the fold state configurations.

FIG. 2 shows various units of the processing engine 104, but it is to be understood that other embodiments are not limited thereon. In other embodiments, the processing engine 104 may include less or more number of units. Further, the labels or names of the units are used only for illustrative purpose and does not limit the scope of the embodiments herein. One or more units can be combined together to perform same or substantially similar function in the processing engine 104.

Figure 3:
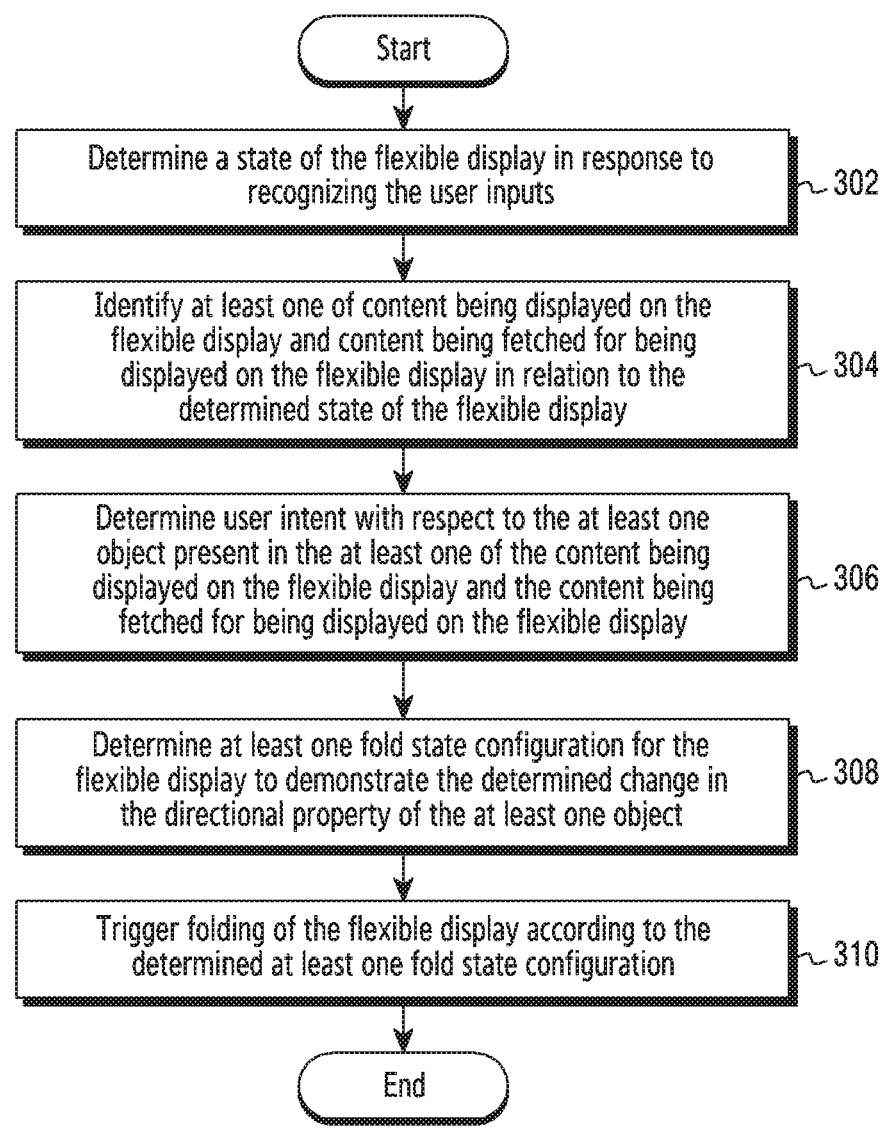
FIG. 3 is a flow chart illustrating a process for managing a flexible display of an electronic device, according to an embodiment of the disclosure.

FIG. 3 is a flow chart illustrating a process for managing the flexible display of the electronic device according to an embodiment of the disclosure.

Referring to FIG. 3, at operation 302, the processing engine 104 determines a state of the flexible display 102 in response to recognizing the user inputs. The user inputs can include at least one of the interactions of the user with the electronic device 100 and the user commands. The processing engine 104 utilizes at least one of the display sensor, one or more switches, and the audio sensor to recognize the user inputs. The current state of the flexible display can be detected using the at least one display sensor. The state of the flexible display 102 can include the information about the at least one of an orientation, a fold state, view angle, a fold angle, a number of folds, folding lines and so on.

At operation 304, the processing engine 104 identifies at least one of the content being displayed on the flexible display 102 or the content being rendered and/or fetched for being displayed on the flexible display 102, in relation to the determined state of the flexible display 102. In an embodiment, the processing engine 104 uses the CNN model to identify the objects present in the content, the position of the objects, and the relation between the objects.

At operation 306, the processing engine 104 determines the user intent with respect to the at least one object present in the at least one of the content being displayed on the flexible display 102 or the content being rendered/fetched for being displayed on the flexible display 102. The processing engine 104 processes the user inputs to determine the user intent and associates the user intent with the objects present in the content.

At operation 308, the processing engine 104 determines the fold state configurations for the flexible display 102 to demonstrate the determined change in the directional property of the object(s). The processing engine 104 determines the change in the directional property of the object of the content based on the user intent. In an embodiment, the processing engine 104 may use at least one of the deep neural network model and indicia overlaid on the object(s) for determining the change in the directional property of the object satisfying the user intent. The processing engine 104 uses the deep neural network model which associates the determined change in the directional property of the object(s), the physical characteristics of the object(s) with the determined state of the flexible display 102 for determining the fold state configurations. The fold state configurations determine the change required in the current state of the flexible display 102 to show the determined change in the directional property of the object. The fold state configurations may include information about at least one of the location of fold/foldable area, the folding lines, the angle of fold, the number of folds, the bending speed, and so on, at which the determined movement of the object(s) can be shown.

At operation 310, the processing engine 104 triggers folding of the flexible display 102 according to the determined fold state configurations. The processing engine 104 generates the suitable voltage representing the fold state configurations and provides the generated voltage to the actuators of the flexible display 102. The actuators further perform the physical bending of the flexible display 102 by controlling the bend sensors. Also, the processing engine 104 can alter the content being displayed on the flexible display 102 or content being rendered/fetched for being displayed on the flexible display 102 by arranging the position of the object(s) of the content according to the fold state configurations.

The various actions, acts, blocks, operations, or the like in the method and the flow diagram in FIG. 3 may be performed in the order presented, in a different order or simultaneously. Further, in some embodiments, some of the actions, acts, blocks, operations, or the like may be omitted, added, modified, skipped, or the like without departing from the scope of the disclosure.

FIGS. 4A, 4B, 4C, 4D, and 4E illustrate example structures of a flexible display of the electronic device 100, according to embodiments of the disclosure.

Referring to FIG. 4A, the flexible display 102 includes the protective layer, the display panel, the driver, the flexible substrate, and the bend sensors along with the actuators. The bend sensors can be configured to sense the least one state (bending/folding, rolling and so on) of the flexible display 102. A shape, a number and a placement/location of the bend sensors may vary according to the size of the flexible display 102. The actuators can be configured to bend the flexible display 102 by controlling the bend sensors according to the electrical signal (the fold state configurations) received from the physical state modifying unit 212 of the processing engine 104.

The flexible substrate may include a plastic substrate which may change on a force being applied. The plastic substrate has a structure where barrier coating is processed on both surfaces on a base film. The base film may be embodied by various types of resins, such as polyimide (PI), polycarbonite (PC), polyethyleneterephtalate (PET), polyethersulfone (PES), polythylenenaphthalate (PEN), fiber reinforced plastic (FRP), and so on to maintain the flexibility of the flexible display 102.

The driver can be configured to perform a function of driving the display panel of the flexible display 102. The driver supplies a driving voltage to a plurality of pixels which drives the display panel 102. In an embodiment, the driver may be embodied as at least one of a thin-film transistor (TFT) LCD, a low temperature polysilicon (LTPS) display, an organic TFT, an electrophoretic display (EPD), an electrochromic display (ECD), an active-matrix liquid-crystal display (AMLCD), plasma display panel (PDP), organic light emitting diodes (OLED) and so on. The protective layer can be configured to protect the display panel. The protective layer may be composed of materials such as, but not limited to, Zro, CeO2, ThO2 and so on. The protective layer may be made in a transparent film format and cover an entire surface of the display panel.

Figure 4B:
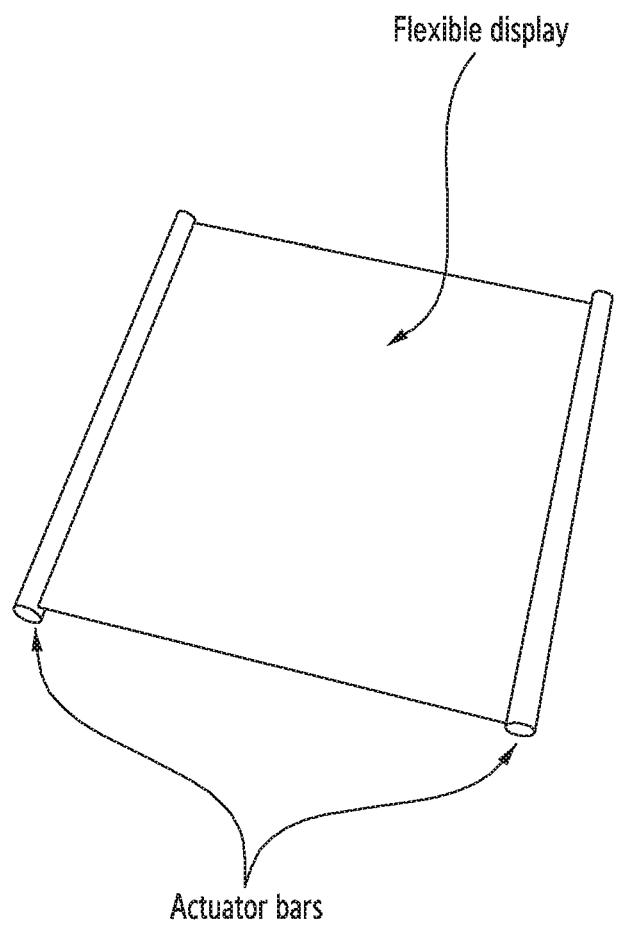

Referring to FIGS. 4B, 4C, 4D, and 4E, example structures of the flexible display 102 are illustrated. The accelerators may be associated with the flexible display 102 (as depicted in FIG. 4B). The accelerators can be attached to the both sides along the length of the flexible display 102 for controlling the bending/folding of the flexible display 102. When the actuators bend, the flexible display 102 also automatically bends.

Figure 4C:
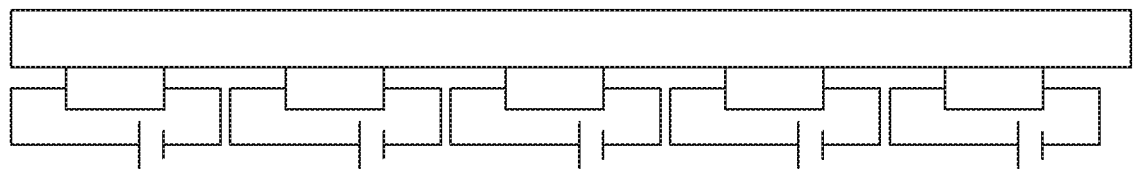
Figure 4D:
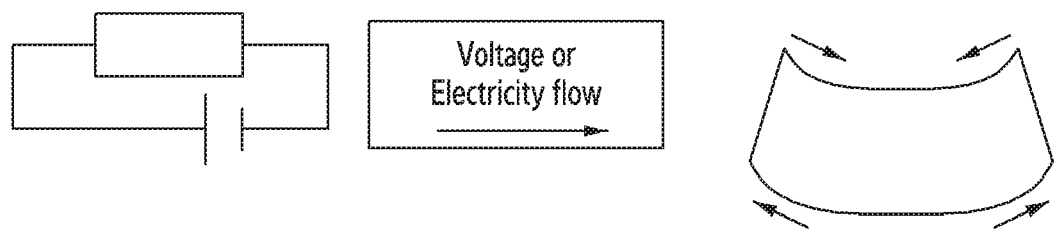
Figure 4E:
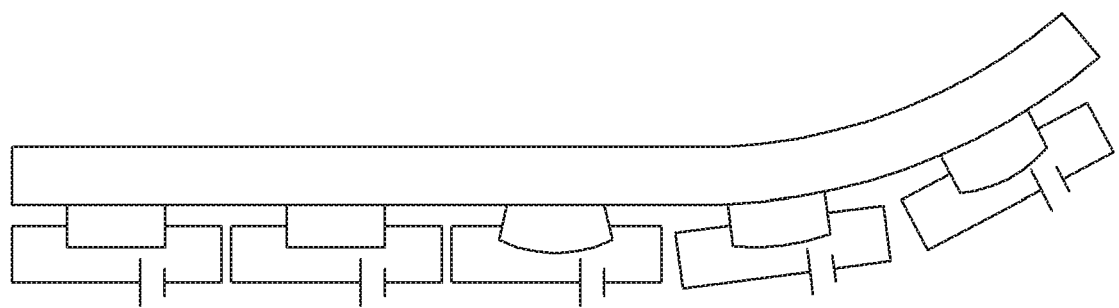

The flexible display 102 further comprises the bend sensors on and/or below surface over a lattice structure (as depicted in FIG. 4C). The bend sensors can be implemented with an electric resistive sensor or an optical fiber sensor having strain. A change in voltage/electric current creates bends (as depicted in FIG. 4D) and hereby bends/folds the flexible display 102 (as depicted in FIG. 4E). A degree of bending/folding can depend on the applied voltage/electric current.

Figure 4F:
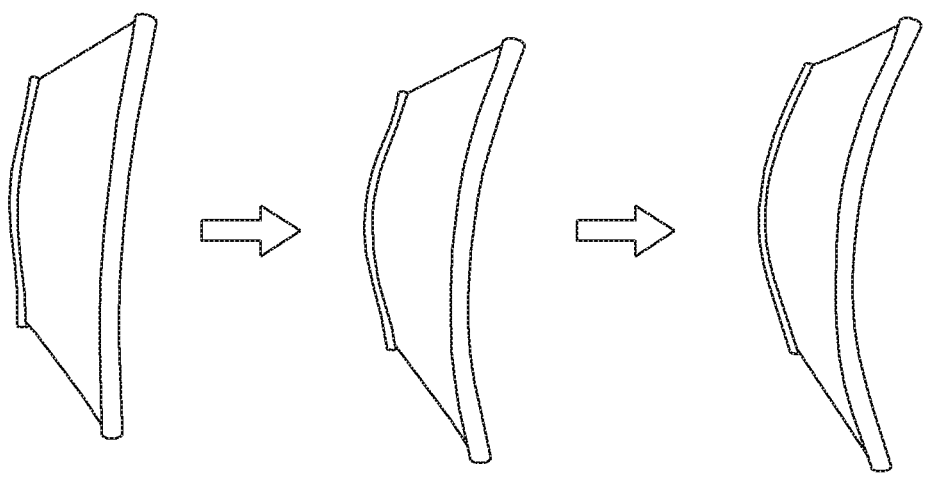
FIG. 4F illustrates a folding created on a flexible display of an electronic device, according to an embodiment of the disclosure.

FIG. 4F illustrates a folding created on the flexible display 102 of the electronic device 100, according to embodiments of the disclosure. The actuators of the flexible display 102 can be used to create the folds on the flexible display 102 as illustrated in FIG. 4F.

Figure 4G:
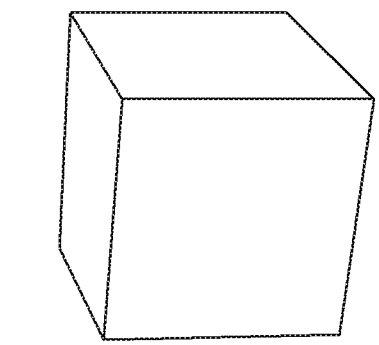
FIG. 4G illustrates an example folding of a flexible display of an electronic device, according to an embodiment of the disclosure.
Figure 4G:
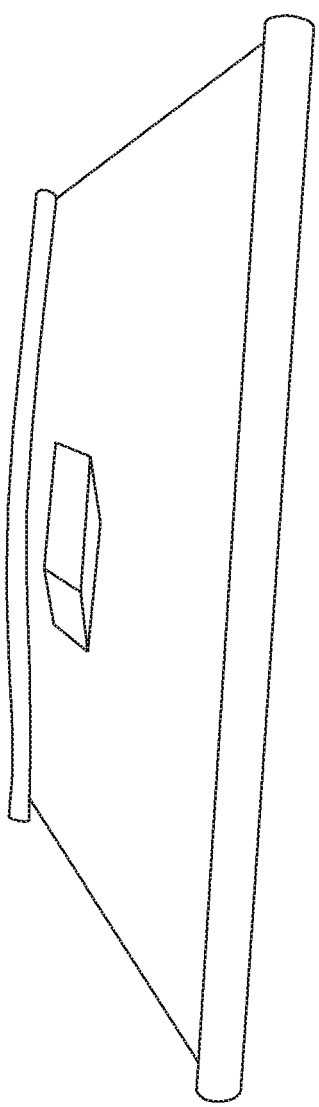

FIG. 4G illustrates an example folding of the flexible display 102 of the electronic device 100, according to embodiments of the disclosure. The processing engine 104 identifies the object for example a box in the content being displayed on the flexible display 102 or the content being rendered/fetched for being displayed on the flexible display 102. The processing engine 104 further determines that the physical properties of the object are to slide on the slant surface. When the user slightly bends (i.e. the interactions of the user) or provides the user commands like "reach left basket", the processing engine 104 determines the change in the directional property of the object (for example, box) to satisfy the user intent identified based on the interactions of the user and/or the user command. For example, the processing engine 104 determines that the movement of the object/box along the left side.

Based on the determined change in the directional property of the object, the processing engine 104 determines a right location on the flexible display and a fold angle (the fold state configurations) to fold the flexible display 102. Thus, the object can be slide along the left side to satisfy the user intent.

Figure 5:
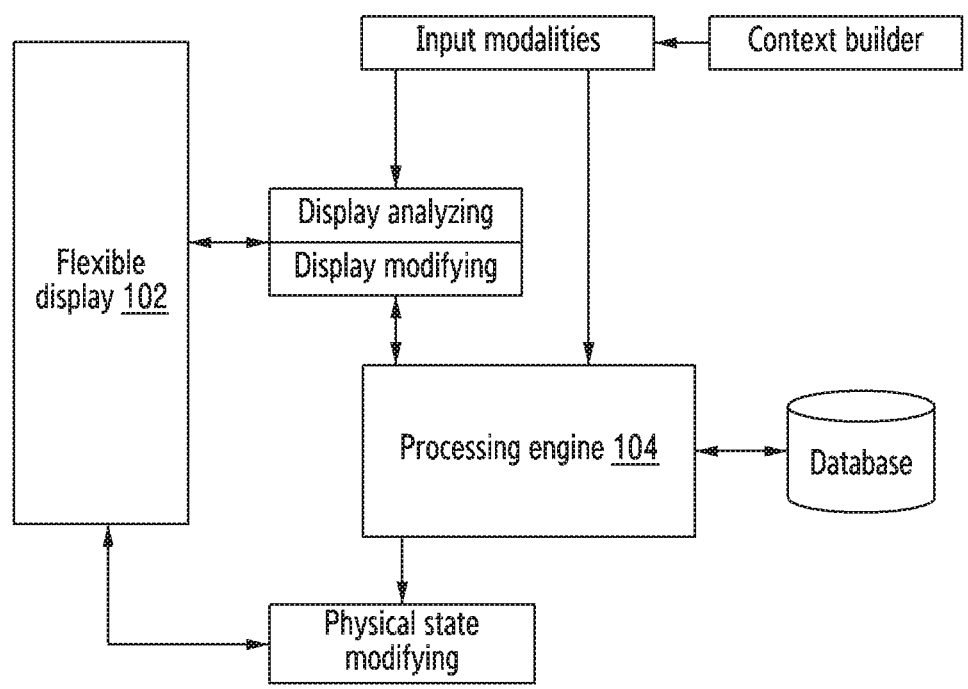
FIG. 5 illustrates an example electronic device for folding a flexible display and altering content being displayed on the flexible display or content being rendered/fetched for being displayed on the flexible display, according to an embodiment of the disclosure.

FIG. 5 illustrates an example electronic device for folding the flexible display and altering the content being displayed on the flexible display or content being rendered/fetched for being displayed on the flexible display, according to an embodiment of the disclosure.

Referring to FIG. 5, the processing engine 104 of the electronic device 100 performs the folding of the flexible display 102. The processing engine 104 receives and processes the input modalities using the context builder. For example, the input modalities include at least one of the interactions of the user and the user inputs. The processing engine 104 determines the state of the flexible display 102 and the objects present in the content being displayed on the flexible display 102 or content being rendered/fetched for being displayed on the flexible display 102.

Based on the processed modalities, the processing engine 104 determines the user intent with respect to the objects present in the content. The processing engine 104 determines the change in the path of movement (the directional property) of the object(s) of the content for satisfying the user intent. In order to show the changes in the path of movement of the object(s), the processing engine 104 determines the fold state configurations for the flexible display 102. The processing engine 104 also generates the electrical signal corresponding to the fold state configurations and provides to the actuators in order to produce the physical fold on the flexible display 102.

In addition, the content display on the flexible display 102 can be altered based on the fold state configurations. An additional folding can be performed based on a feedback of the current foldable state to satisfy the user intent.

FIG. 6A illustrates units of the processing engine for determining fold state configurations for the flexible display, according to an embodiment of the disclosure.

Referring to FIG. 6A, the input recognition unit 202 recognizes the user inputs. The display analyzing unit 204 determines the state (the foldable state and physical characteristics) of the flexible display 102 and accordingly identifies the content being displayed on the flexible display 102 or content being rendered/fetched for being displayed on the flexible display 102. Based on the at least one of the recognized user inputs and the displayed content, the user intent determination unit 206 determines the user intent and relates with the objects present in the content.

The user intent determination unit 206 may use the intent database to determine the user intent and the object knowledge database to relate the user intent with the objects present in the content. Based on the relation of the user intent with the objects present in the content, the object movement tracking unit 208 determines the change in the path of movement of the object(s) associated with the user intent using the object association database. The determined change in the path of movement of the objects can be shown by folding the flexible display 102 and altering the content.

The altered content can be provided to the flexible display 102 and the altered content can be displayed according to the fold state configurations.

Once the change in path of movement of the object(s) of the content is determined, the fold allocating unit 210 determines the fold state configurations for the flexible display 102 using the database including the historical fold data. The fold state configurations can be provided in the form of voltage to the actuators of the flexible display 102 for performing the physical folding of the flexible display. Also, the altered content can be displayed on the flexible display 102 simultaneously with the folding of the flexible display 102.

Figure 6B:
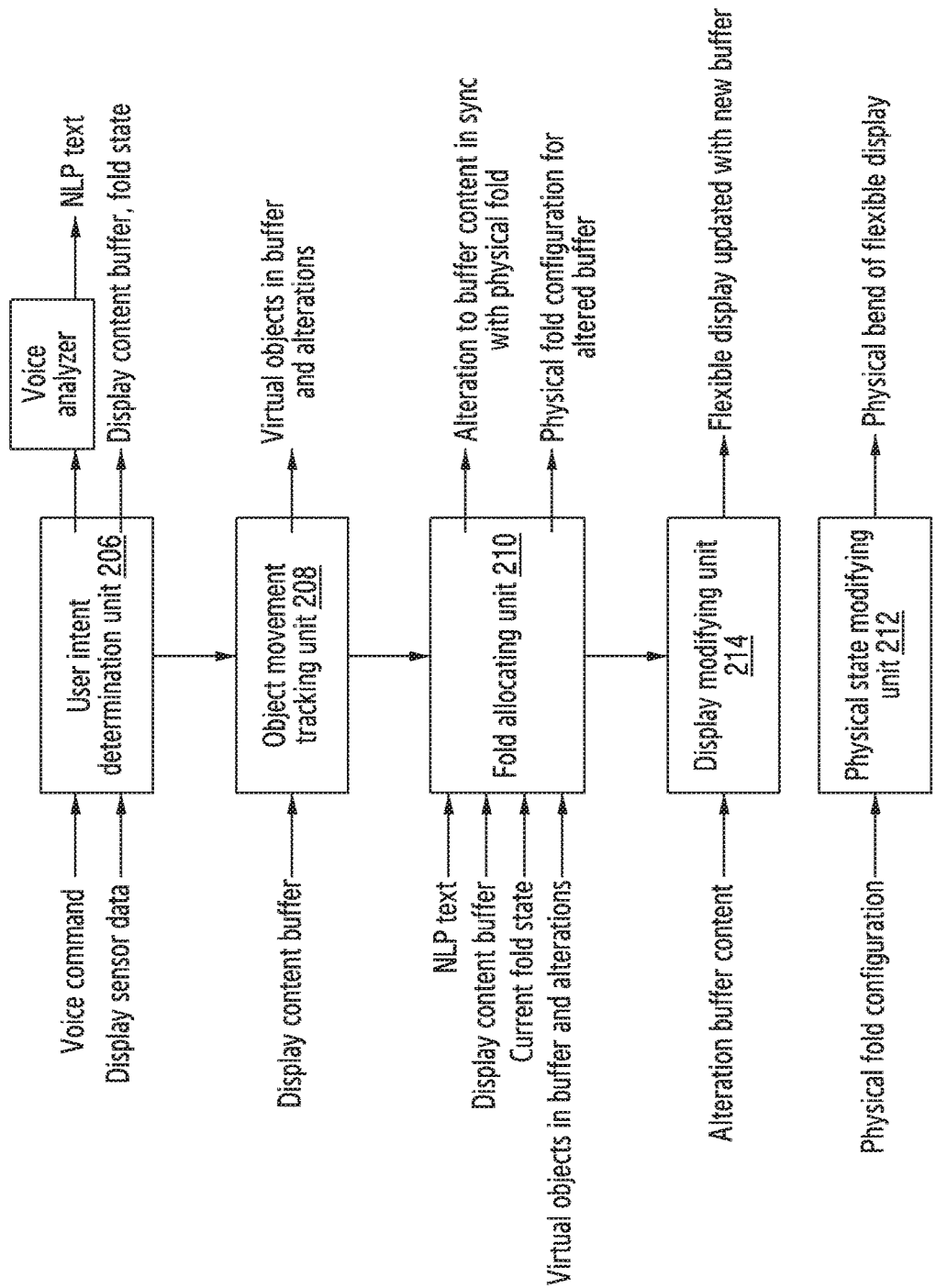
FIG. 6B illustrates an interconnection between units of a processing engine, according to an embodiment of the disclosure.

FIG. 6B illustrates an interconnection between units of the processing engine for determining the fold state configurations for the flexible display, according to embodiments of the disclosure.

Referring to FIG. 6B, the user intent determination unit 206 may receive the recognized at least one of the user inputs, display sensor data (the state and physical characteristics of the flexible display 102) and so on. The user intent determination unit 206 may use a voice analyzer which processes the user inputs using the NLP techniques to output the NLP text. The NLP text may indicate the user intent. The user intent determination unit 206 associates the user intent with the objects present in the content The object movement tracking unit 208 may receive the relation of the user intent with respect to the objects present in the content from the user intent determination unit 206 and the display sensor data from the display analyzing unit 204. Based on the relation of the user intent with respect to the objects present in the content present in a buffer/memory 106 (which can be accessed for displaying the content on the flexible display), the object movement tracking unit 208 determines alterations in the movement/directional property of the object(s) of the content. The object movement tracking unit 208 determines the alterations in the directional property of the object(s) by associating the physical characteristics of the object(s) with respect to the display sensor data related to the flexible display 102.

The fold allocating unit 210 may receive the user intent determined with respect to the content from the user intent determination unit 206 and the display sensor data from the display analyzing unit 204, and the determined altered directional property of the object(s) from the object movement tracking unit 208. Based on the received data, the fold allocating unit 210 determines the fold state configurations for the flexible display 102 to move/slide the object(s) along the determined path of movement. The fold state configurations indicate at least one of the number of folds, the folding/bending speed, the location of fold/foldable area, the angle of the fold and so on required for the physical folding of the flexible display 102.

The display modifying unit 214 may receive the fold state configurations based on an altered buffer. The altered buffer may contain the object(s) of the content for which the change in the path of the movement is determined based on the user intent. The display modifier 214 alters the content by moving/sliding the object(s) of the content according to the determined path of the movement and the determined fold state configurations. In addition, the display modifier 214 alters the content by modifying the size of the object(s). The display modifier 214 displays the object(s) of the content (present in the altered buffer) in synchronization with the physical folding of the flexible display 102.

The physical state modifying unit 212 may receive the fold state configurations from the fold allocating unit 210 and provides the corresponding electrical signal to the actuators to perform the physical folding of the flexible display 102.

Figure 7A:
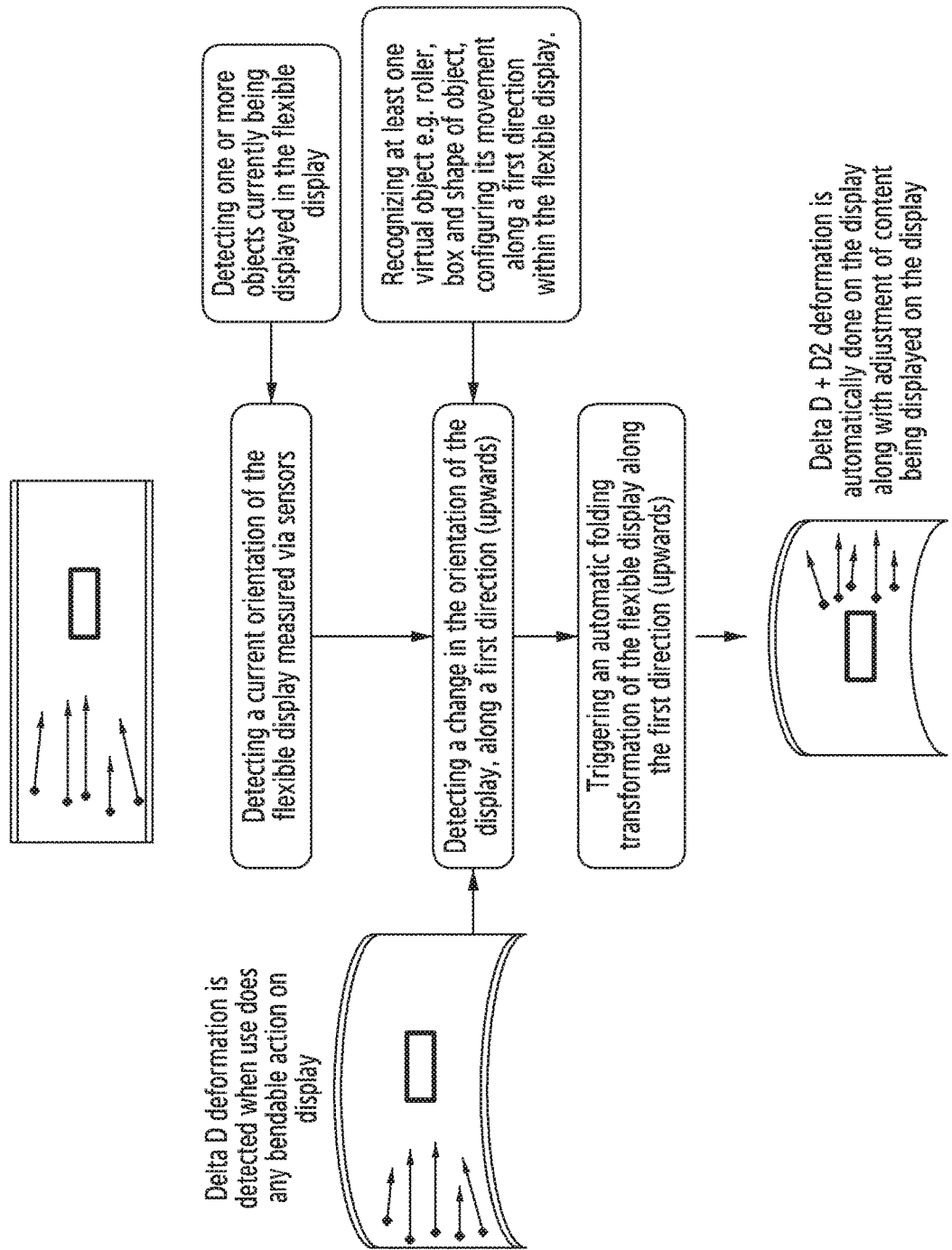
FIG. 7A is an example flow chart illustrating a process for determining fold state configurations for a flexible display of an electronic device, according to an embodiment of the disclosure.

FIG. 7A is an example flow chart illustrating a process for the fold state configurations for the flexible display of the electronic device 100, according to an embodiment of the disclosure.

Referring to FIG. 7A, consider an example scenario, wherein the user is playing a game. The processing engine 104 recognizes the user inputs while playing the game. For example, the user may bend the flexible display 102 or the user may give the voice command to bend the flexible display 102 to save the object in a box from arrows. The processing engine 104 also detects the current state of the flexible display 102 (an orientation, foldable lines, angle of fold, and so on) using the at least one display sensor. For example, the processing engine 104 may detect a Delta D deformation/folding of the flexible display 102. The processing engine 104 determines the objects (the arrows, the object in the box) present in the content being displayed on the flexible display 102 or the content being rendered/fetched for being displayed on the flexible display 102 in relation to the Delta D transformation.

The processing engine 104 determines the user intent with respect to the objects present in the content. The user intent may be determined so as to save the object in the box from the arrows. The processing engine 104 determines the change required in the path of movement of the object in the box for satisfying the user intent. The path of movements of the object can be determined along the first direction (upwards). The processing engine 104 determines the fold state configurations for moving the object along the determined path of movement to save the object from the arrows. The fold state configurations may indicate change in delta angle (Delta D+D2) required for performing the folding of the flexible display 102. According to the fold state configurations, the processing engine 104 may provide the suitable voltage to the actuators to fold the flexible display 102 along with the adjustment of the content being displayed on the flexible display 102. Thus, by folding the flexible display 102, the object in the box may be moved backwards and the positions of the arrows may be adjusted. Since the object has moved backwards, the arrows may not hit the object and may strike on other part of a screen of the flexible display 102.

Figure 7B:
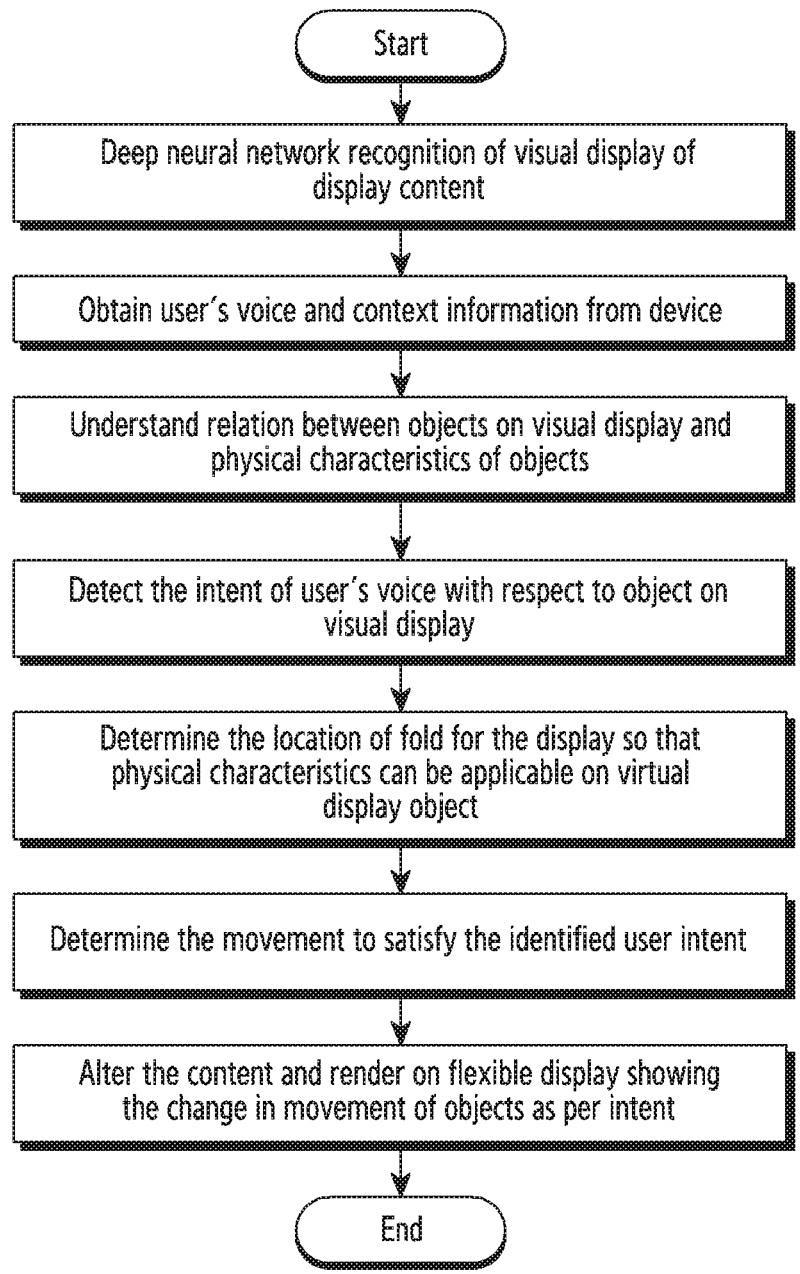
FIG. 7B is an example flow chart illustrating a process for altering content being displayed on a flexible display or content being rendered/fetched for being displayed on the flexible display of an electronic device based on fold state configurations, according to an embodiment of the disclosure.

FIG. 7B is an example flow chart illustrating a method for altering the content being displayed on the flexible display or content being rendered/fetched for being displayed on the flexible display of the electronic device based on the fold state configurations of the flexible display, according to an embodiment of the disclosure.

Referring to FIG. 7B, the processing engine 104 identifies the content being displayed on the flexible display 102 or content being rendered/fetched for being displayed on the flexible display 102 using the at least one deep neural network model. The processing engine 104 obtains the at least one of the interactions of the user and the user commands (the user's voice) using the at least one sensor associated with the electronic device 100 and the context information (the user activity, time, location, and so on) from the electronic device 100.

The processing engine 104 determines the relation between the objects present in the content and the physical characteristics of the objects present in the content. The processing engine 104 detects the user intent with respect to the objects present in the content by processing the at least one of the interactions of the user with the electronic device 100 and the user commands. The processing engine 104 can determine the user intent.

The processing engine 104 determines the current fold state of the flexible display 102 and the physical characteristic of the fold state which can be applied on the objects present in the content. Based on the determined current fold state and the physical characteristic of the fold, the processing engine 104 determines the movement for the object(s) in order to satisfy the user intent. The processing engine 104 alters the content and renders the content on the flexible display 102 by showing the change in the movements of the object(s) as per the user intent.

Figure 7C:
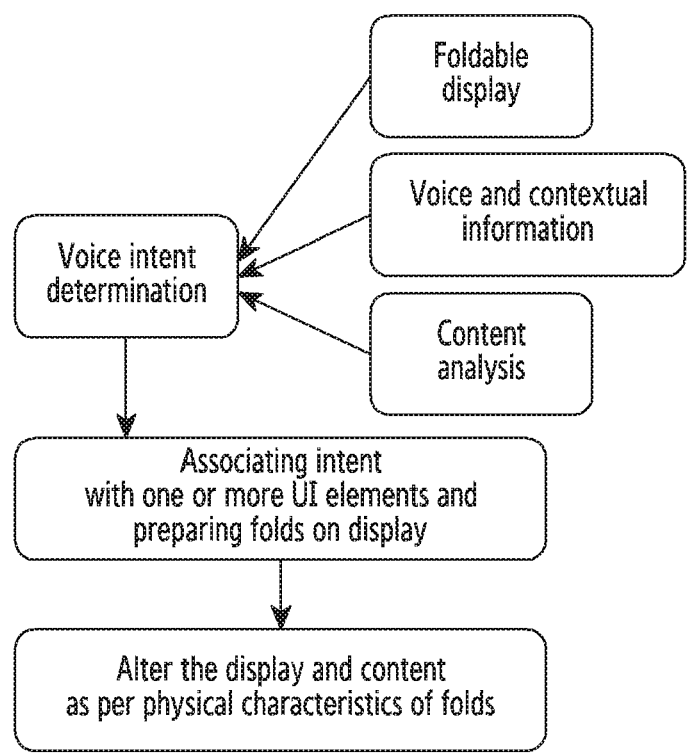
FIG. 7C is an example flow chart illustrating a process for managing a flexible display of an electronic device, according to an embodiment of the disclosure.

FIG. 7C is an example flow diagram illustrating a method for managing the flexible display of the electronic device, according to an embodiments of the disclosure.

Referring to FIG. 7C, the processing engine 104 detects the user intent using the recognized at least one of the interactions of the user, the user commands, the context information, the content being displayed on the flexible display 102 or content being rendered/fetched for being displayed on the flexible display 102 and the state of the flexible display 102. The processing engine 104 further associates the user intent with the objects present in the content being displayed on the flexible display 102 or content being rendered/fetched for being displayed on the flexible display 102. Thereafter, the processing engine 104 determines the fold state configurations (a number of folds, a location of fold, an angle of fold and so on) for the flexible display 102 to satisfy the user intent. According to the fold state configurations, the processing engine 104 alters the content and triggers the folding of the flexible display 102.

Figure 8A:
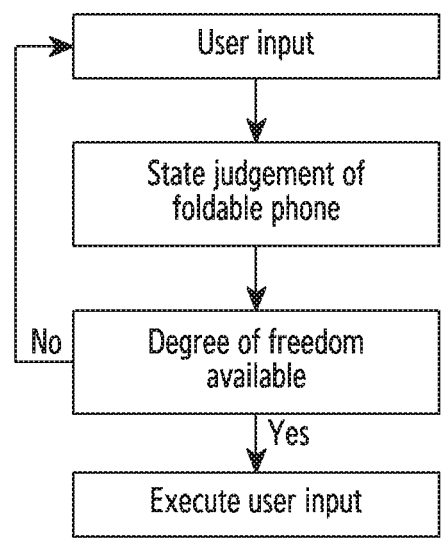
FIG. 8A is an example flow chart illustrating a process for executing a user input on a flexible display based on a state of an electronic device, according to an embodiment of the disclosure.
Figure 8A:
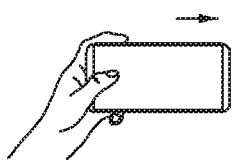
Figure 8A:
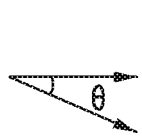
Figure 8A:
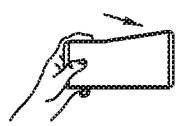

FIG. 8A is an example flow chart illustrating a process for executing the user input on the flexible display based on a state of the electronic device, according to an embodiment of the disclosure.

Referring to FIG. 8A, the processing engine 104 recognizes the user inputs (the user interactions of the user and the user commands) and determines the state of the electronic device 100 (whether in a bag, a container, a user holding the phone using the left hand and so on). The state of the electronic device 100 can be determined using sensor inputs like a gyroscope data, an accelerometer data, a view angle, a user position, a fold state, a human hold and so on.

The processing engine 104 determines the availability of the degree of freedom based on the state of the electronic device 100. The degree of freedom indicates the possibility of folding the flexible display 102 with respect to the determined state of the electronic device 100. For example, if the processing engine 104 determines that it is unable to fold the flexible display 102, then the processing engine 104 informs the user through the appropriate response (for example, the natural language alert, a pop-up, an indication, and so on). On determining the availability of the degree of freedom, the processing engine 104 executes the user input by performing the folding of the flexible display 102 according to the fold state configurations.

Figure 8B:
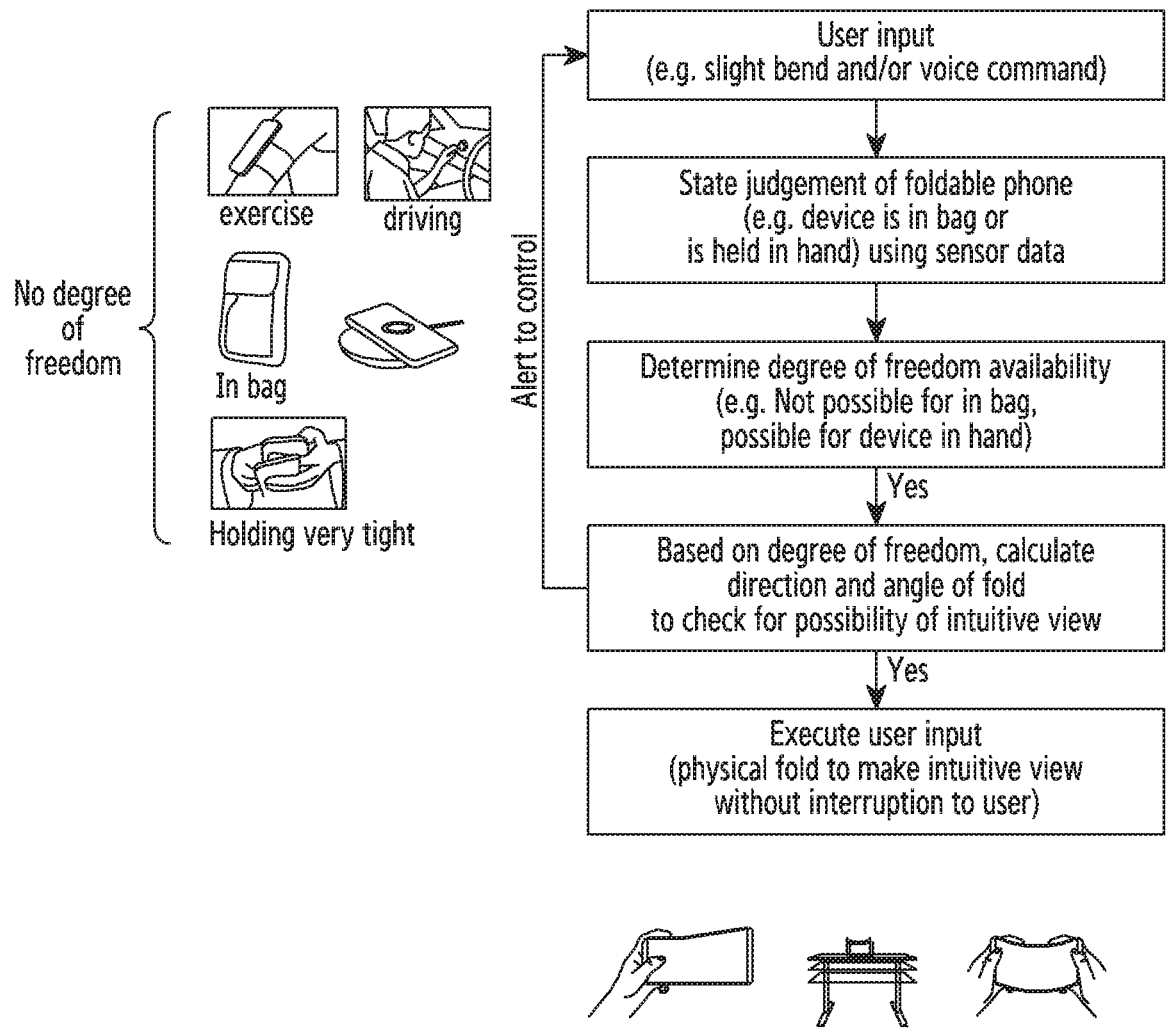
FIG. 8B is an example flow chart illustrating a process for generating an intuitive view based on a state of an electronic device, according to an embodiment of the disclosure.

FIG. 8B is an example flow chart illustrating a process for generating an intuitive view based on the state of the electronic device, according to an embodiment of the disclosure.

Figure 8C:
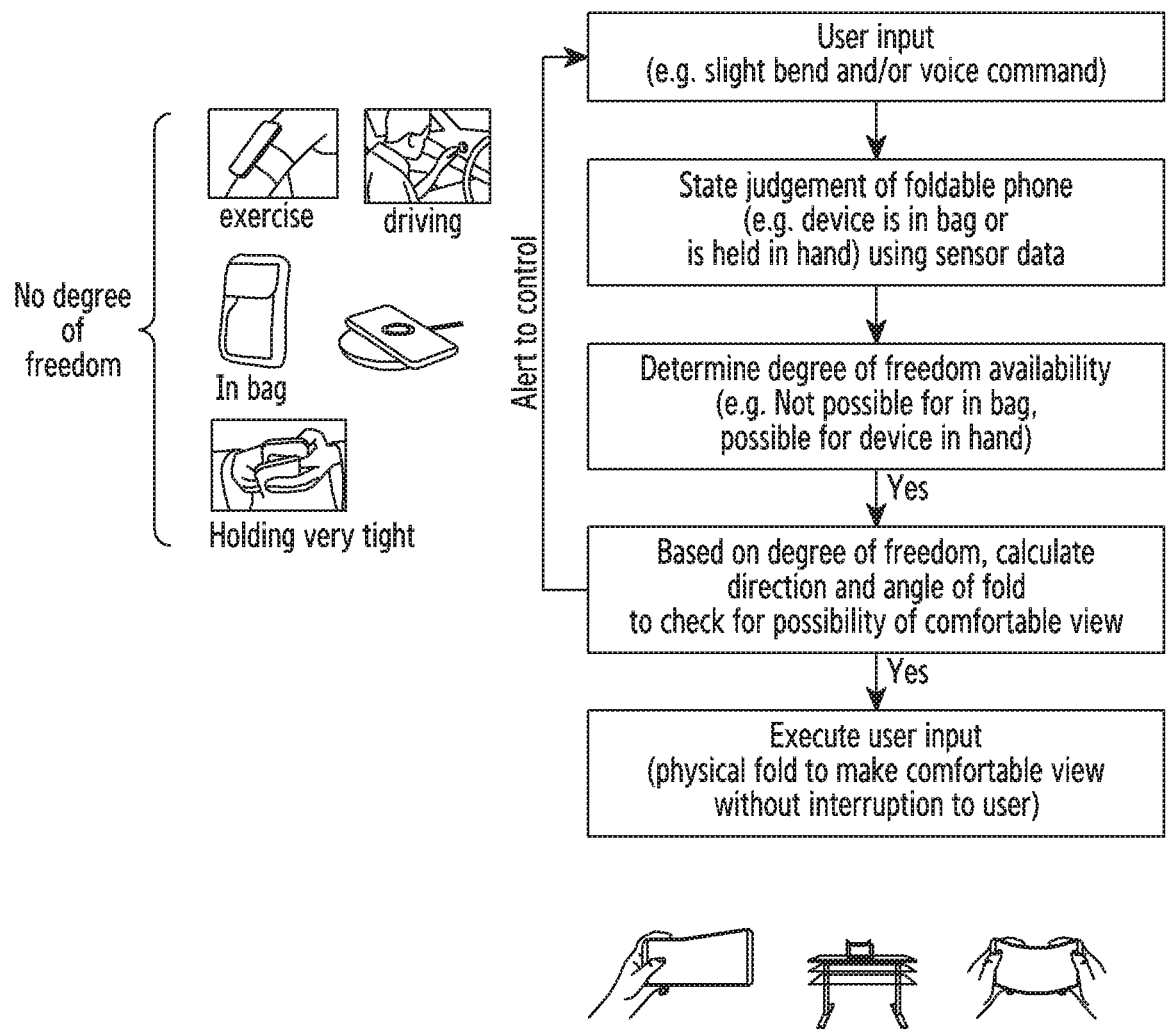
FIG. 8C is an example flow chart illustrating a process for generating a comfortable view based on a state of an electronic device, according to an embodiment of the disclosure.

FIG. 8C is an example flow chart illustrating a process for generating a comfortable view based on the state of the electronic device, according to an embodiment of the disclosure.

Referring to FIGS. 8B and 8C, the processing engine 104 recognizes the user inputs (the interactions of the user and the user voice commands). On recognizing the user inputs, the processing engine 104 detects the current state of the electronic device 100 (e.g., device is in a bag, a desk, a user's hand, and so on). Based on the judgment of the current state of the electronic device 100, the processing engine 104 determines the degree of freedom.

If the processing engine 104 determines that the foldable action cannot be performed on the flexible display 102, the appropriate response may be sent to the user indicating the impossibility of performing the folding action. Consider an example scenario, wherein the electronic device 100 is in the closed location (such as in a bag, container, on a desk, and so on). In this case, the processing engine 104 does not perform the folding of the flexible display 102. Consider another scenario, wherein the user is holding the electronic device 100 using a single hand (a left hand) Then the processing engine 104 does not perform the folding of the flexible display 102. Consider yet other scenario, wherein the user is using the electronic device 100 during charging, driving, exercising, and so on. Then the processing engine 104 does not perform the folding of the flexible display 102.

On determining the availability of the degree of freedom for the current state of the electronic device 100, the processing engine 104 calculates the direction and the angle of fold (the fold state configurations). The direction and the angle of fold can be calculated to generate at least one of the intuitive view (as illustrated in FIG. 8B), a comfortable view (as illustrated in FIG. 8C) and so on for executing the user command The at least one of the intuitive view, the comfortable view, and so on can be generated by performing the physical folding of the flexible display. In an example herein, according to the intuitive view, there may be no interruption to the user's gaze when the user is watching the electronic device 100. For example, the intuitive view avoids the folding of the electronic device 100 backwards and further avoids interruptions, which may cause to the user because of folding of the electronic device 100 backwards. In another example herein, the comfortable view allows the user to watch the electronic device 100 without altering his head position when the user is holding the electronic device 100 in single hand and the other side of the electronic device 100 folds towards the user.

Figure 9A:
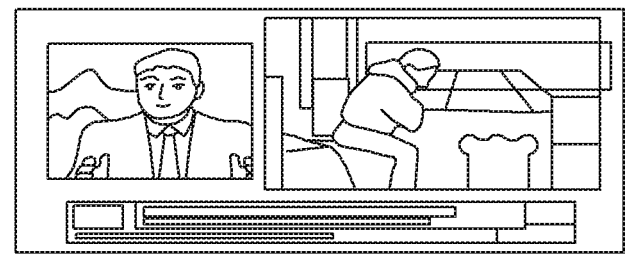
FIGS. 9A, 9B, and 9C are examples illustrating folding of a flexible display and display of content on the flexible display of an electronic device, according to embodiments of the disclosure.
Figure 9A:
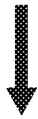
Figure 9A:
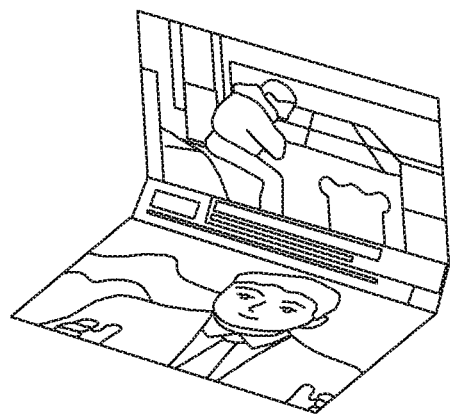
Figure 9A:
Figure 9A:
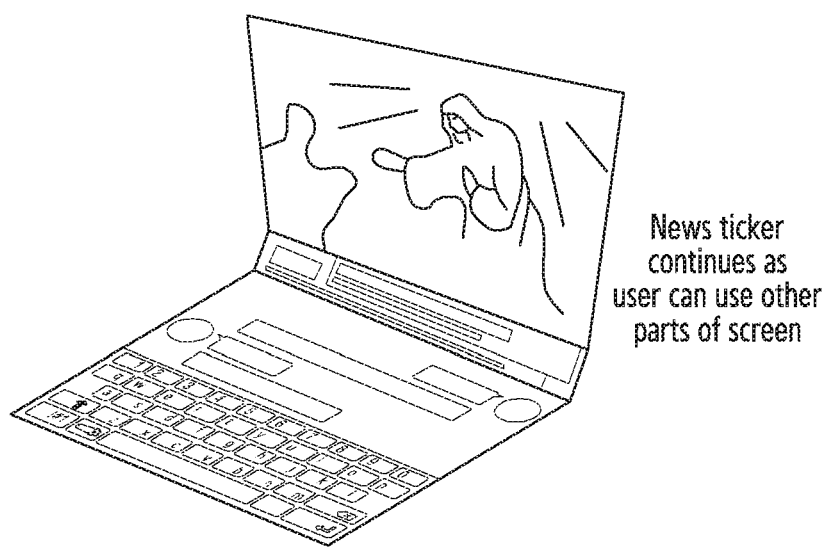
Figure 9B:
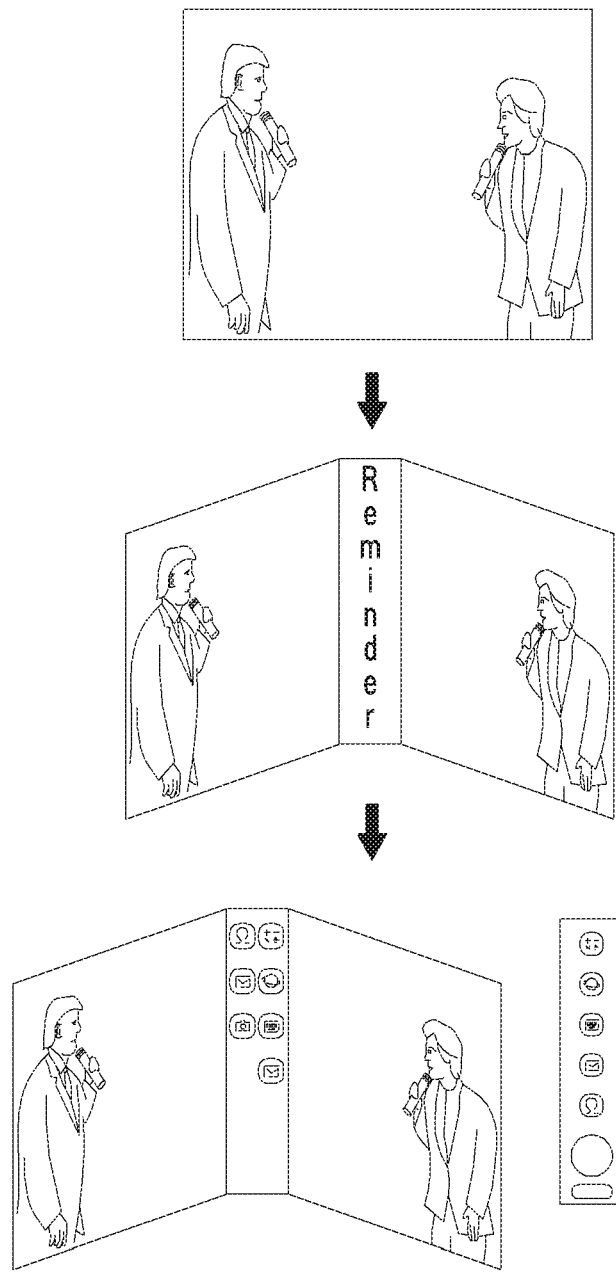
Figure 9C:
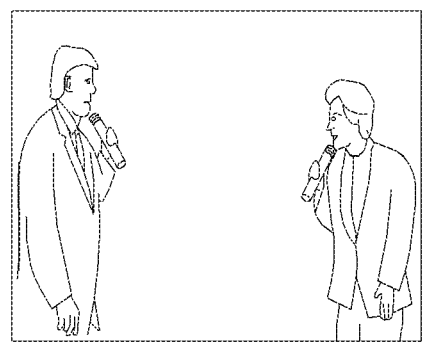
Figure 9C:
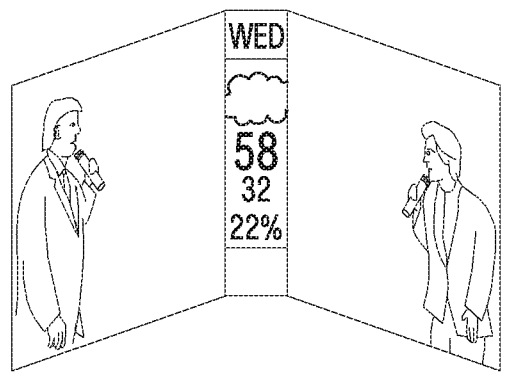

FIGS. 9A, 9B and 9C are example diagrams illustrating folding of the flexible display 102 and display of the content on the flexible display 102 of an electronic device, according to embodiments as disclosed herein.

Referring to FIG. 9A, initially the user is watching news on a TV. Consider a scenario, after some time passes, the user starts watching some other video and provides the voice command by saying "news". The processing engine 104 identifies the user intent (from the user voice command) and associates the user intent with a news ticker (the object of the content (the news)). The processing engine 104 determines the fold state configurations (number of folds, a foldable area, an angle of fold and so on) for folding the flexible display 102 by satisfying the user intent. Based on the determined fold state configurations, the processing engine 104 folds the flexible display and displays the news ticker on the folded area of the flexible display 102.

Referring to FIG. 9B, initially the user is watching a debate going on between two people. After some time, the user wants to check for the reminders/updates regarding the edge functions (applications, calendar, device maintenance and so on) and provides the voice command such as "edge functions" to the electronic device 100. The processing engine 104 recognizes the voice command and the user intent of displaying the reminders regarding the edge functions. Based on the user intent, the processing engine 104 determines the fold state configurations for the flexible display 102. According to the fold state configurations, the processing engine 104 folds the flexible display and displays the reminders regarding the edge functions on the folded area. Thus, the user can also watch the reminders on the folded area of the flexible display 102 while watching the debate.

Referring to FIG. 9C, the processing engine 104 displays weather updates on the folded area of the flexible display 102 on receiving the voice commands such as "weather updates".

Figure 10:
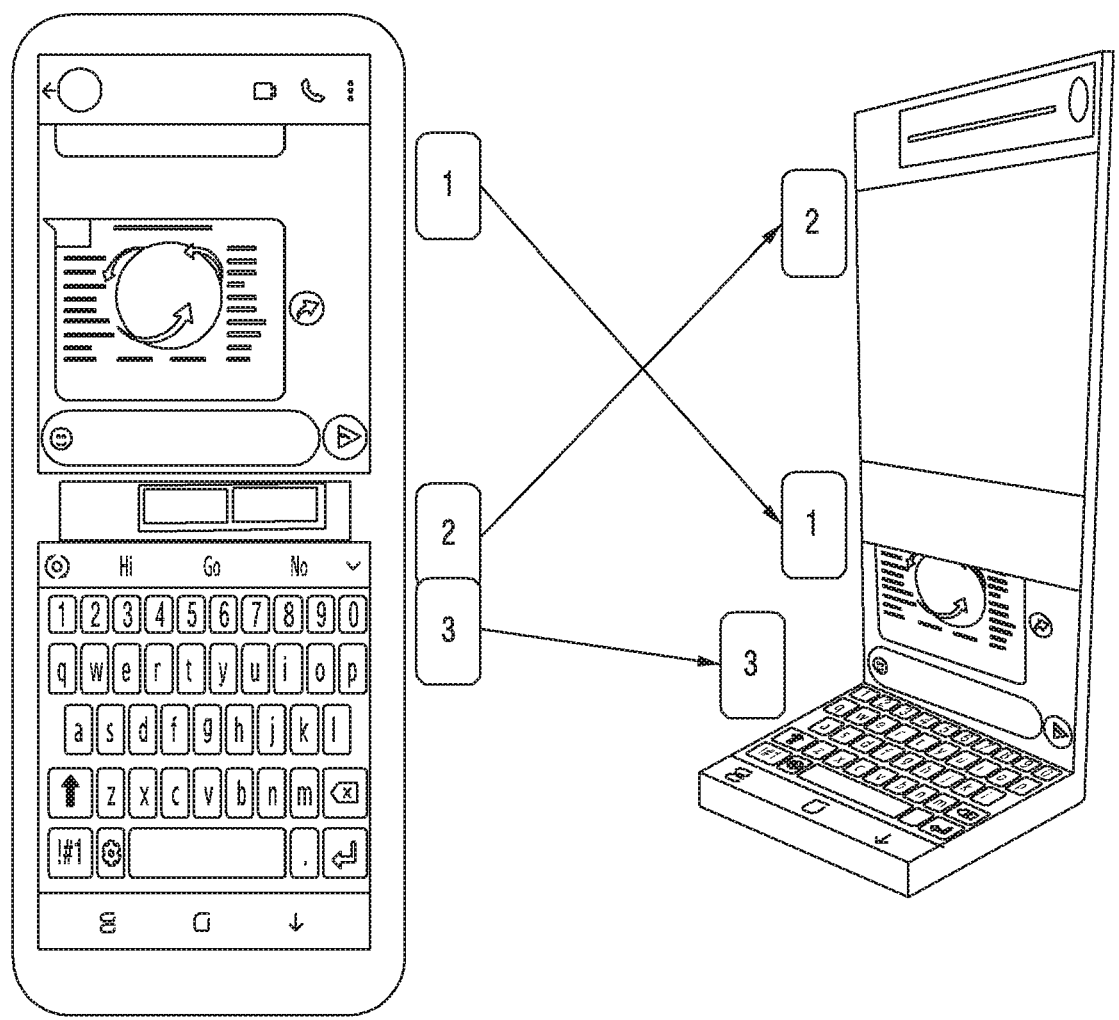
FIG. 10 illustrates an example of a multi window display mode of the flexible display, according to an embodiment of the disclosure.

FIG. 10 depicts a multi-window display mode of the flexible display, wherein a position of the object(s) of the content displayed on the flexible display may be altered, according to an embodiment of the disclosure.

Referring to FIG. 10, the multi-window display mode can be used to arrange and display one or more type of content within a single screen. For example, consider a scenario, wherein the user wants to watch a video and use a chat application within the single screen of the flexible display 102. However, in various approaches, the video displayed (while sending messages using the chat application) on the same screen gets blocked. In contrast, the processing engine 104 may recognize the user intent of watching the video along with the chat application. Based on the user intent, the processing engine 104 determines the change in the path of movement of the object(s) (a video clip, a keypad of the chat application, messages displayed on the screen and so on) based on at least one of a size, a shape of the objects, best visible options, and so on for satisfying the user intent. Further, the processing engine 104 determines the fold state configurations to perform the folding of the flexible display 102 such that the at least one of the video clip, the keypad, the messages and so on can be arranged (according to the configured path of movement) without user intervention. Thus, the video clip is not blocked and rendered properly which satisfies the user intent.

Figure 11:
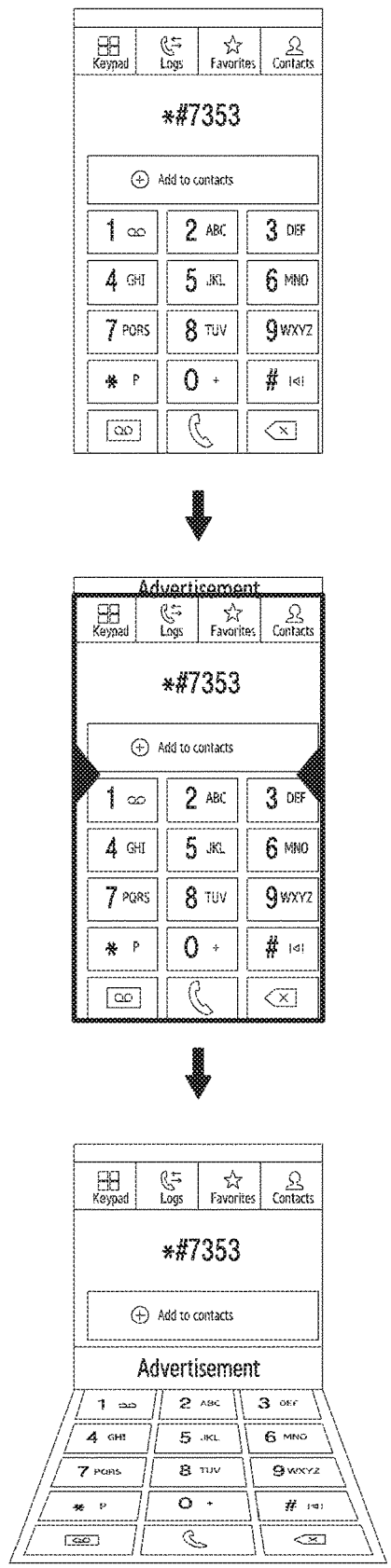
FIG. 11 illustrates an example folding of a flexible display of an electronic device, wherein the flexible display operates in a semi-automatic folding mode, according to an embodiment of the disclosure.

FIG. 11 is an example diagram illustrating the folding of the flexible display of the electronic device, wherein the flexible display operates in a semi-automatic folding mode, according to an embodiment of the disclosure.

Referring to FIG. 11, consider a scenario, wherein the user gets an advertisement or notification while dialing a phone number. Once the advertisement is displayed, an indicia for indicating for the pre-defined foldable areas can be displayed on the flexible display 102 since the flexible display 102 is being operated in the semi-automatic folding mode. Based on the pre-defined foldable areas, the processing engine 104 determines the path of movement for the advertisement. When the user folds the flexible display 102 according to the displayed pre-defined foldable areas, the processing engine 104 displays the advertisement on the folded area to the user without interrupting the dialing of the phone number.

FIGS. 12A to 12K are example diagrams illustrating folding of the flexible display 102 and altering the content being displayed on the flexible display 102 or the content being rendered/fetched for being displayed on the flexible display 102 of the electronic device 100, according to embodiments of the disclosure.

Figure 12A:
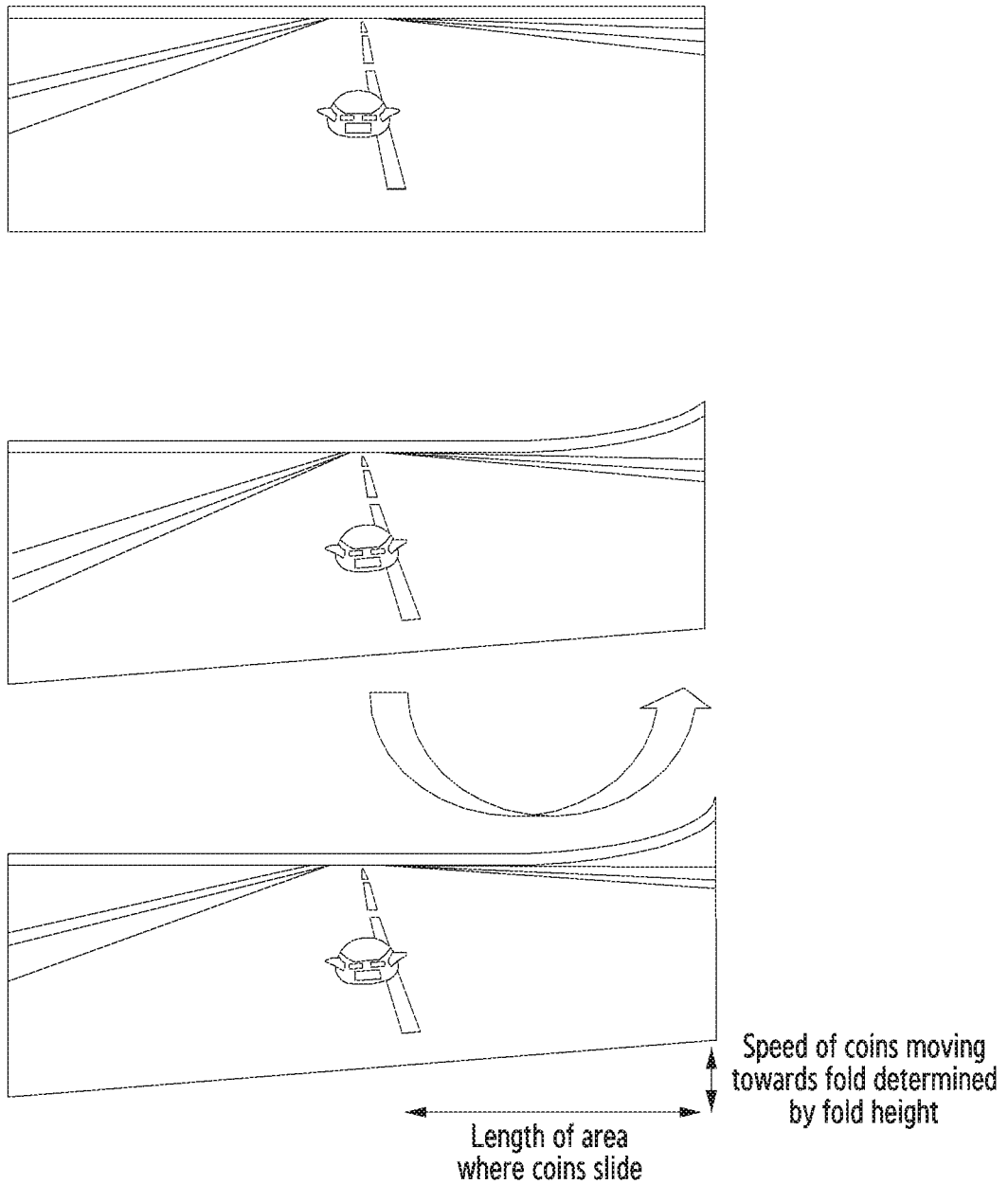
FIGS. 12A, 12B, 12C, 12D, 12E, 12F, 12G, 12H, 12I, 12J, and 12K are example diagrams illustrating folding of a flexible display and altering content being displayed on the flexible display or the content being rendered/fetched for being displayed on the flexible display of an electronic device, according to embodiments of the disclosure.

FIG. 12A depicts an example scenario, where the user is playing a three-dimensional (3D) game on a device with the flexible display 102. Consider that the user says "Fold Collect" and/or the user slightly bends the display. The processing engine 104 identifies the image frame along with context of a game being played (using the deep neural network model) and the user intent. The user intent may be understood as to stay in the bike path and collect more coins. Due to the fold, the coins will gradually slide inwards. The processing engine 104 determines the change in the path of movement of the coins (the objects) and determines the fold state configurations for the flexible display 102 which can show the changed path of movement of the coins.

The processing engine 104 calculates a suitable voltage to control the bend sensors of the flexible display 102. The processing engine 104 provides the calculated voltage to the actuators of the flexible display 102 which folds the flexible display by controlling the bend sensors. Simultaneously, the processing engine 104 creates a subsequent media on the flexible display by sliding the coins according to the changed path and the fold state configurations. The coins slide towards the rider due to the folding of the flexible display 102. Thus, the folding of the flexible display 102 based on the user intent creates a new gaming experience for the user.

Figure 12B:
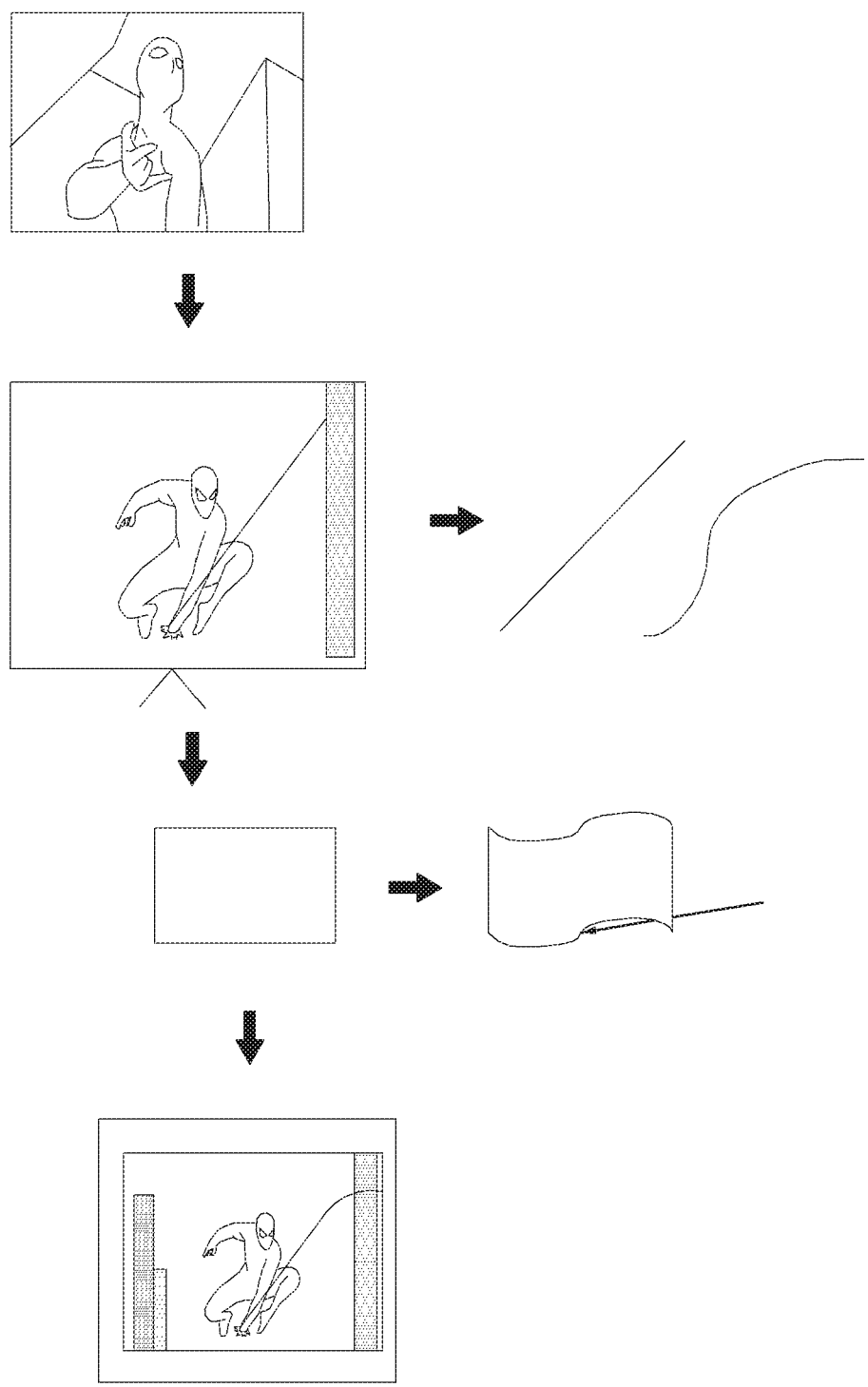

FIG. 12B depicts an example scenario, where the user is watching a program on a TV with the flexible display 102. A thread that a character in the program uses is set straight and follows the path. The user says 'Fold Swing'. The processing engine 104 identifies the image frame along with context of a program being watched (using the deep neural network model) and the user intent. The user intent of 'fold swing' may be understood as the character has to go around in swing action generating torque due to the physical fold. The processing engine 104 determines the change in the path of movement of the character (the object) for satisfying the user intent. Further, the processing engine 104 determines the fold state configurations for the flexible display 102 to generate the changed path of movement.

The processing engine 104 calculates a suitable voltage to control the bend sensors of the flexible display 102 according to the fold state configurations. The processing engine 104 provides the calculated voltage to the actuators of the flexible display 102 which folds the flexible display by controlling the bend sensors. Simultaneously, the processing engine 104 creates a subsequent media on the flexible display, wherein the character (the object) follows the changed path of movement. Swinging is now closer due to torque effect. Thus, the folding of the flexible display 102 based on the user intent provides a unique experience to the user.

Figure 12C:
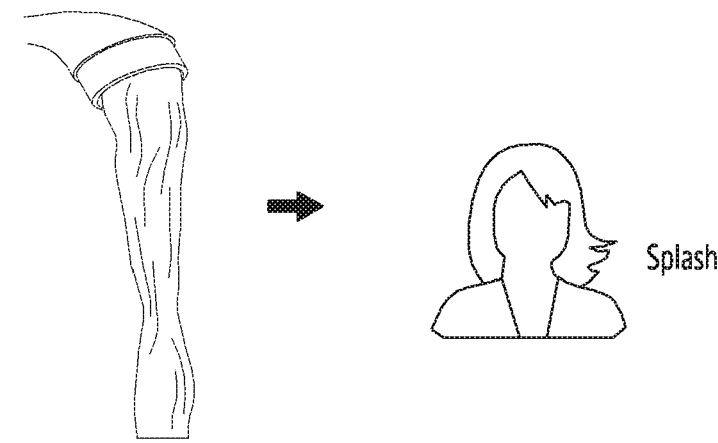
Figure 12C:
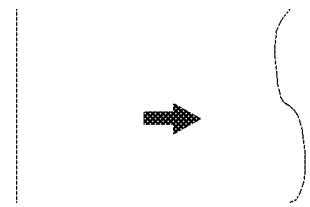
Figure 12C:
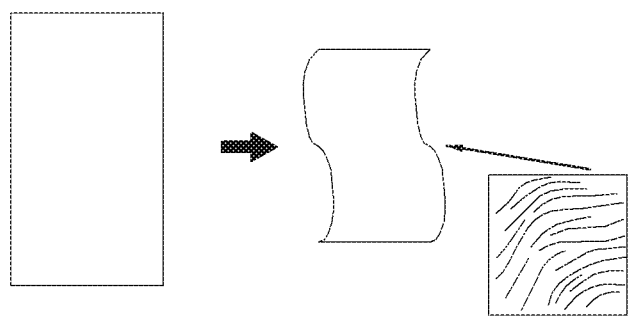
Figure 12C:
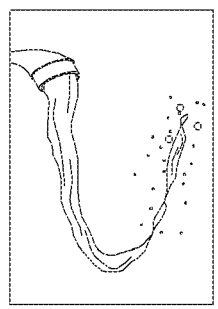
Figure 12C:
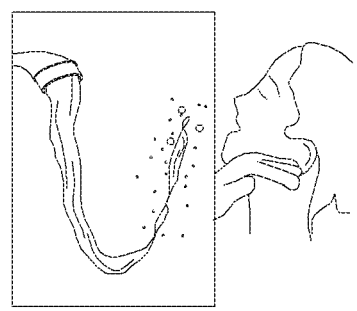

FIG. 12C depicts an example scenario, wherein the user is watching the TV with the flexible display 102 and water flow is shown on the flexible display 102 in a mixed reality program. Consider that the user says 'Fold Splash' while watching the TV. The processing engine 104 recognizes the user voice and understands the image frame along with context of program being watched and the user intent. The user intent of 'fold splash' is understood as water has to be obstructed in order to create the path. The processing engine 104 determines the change in the path of movement of water (the object). Further, the processing engine 104 determines the fold state configurations for the flexible display 102 to show the changed path of movement of water.

The processing engine 104 calculates a suitable voltage to control the bend sensors of the flexible display 102 according to the fold state configurations. The processing engine 104 provides the calculated voltage to the actuators of the flexible display 102 which folds the flexible display by controlling the bend sensors. Simultaneously, the processing engine 104 creates a subsequent media on the flexible display 102, wherein water (the object) follows the changed path. The splash effect gets created due to intelligent folding of the flexible display 102. Thus, in the mixed reality, the user can get splashed with unique rich experience.

Figure 12D:
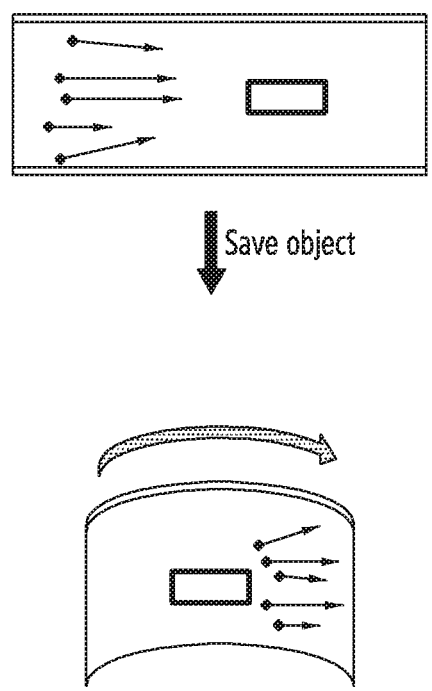

FIG. 12D depicts an example gaming scenario, wherein the user says 'save object from arrows'. On recognizing the user voice command, the processing engine 104 determines the image frame along with context of game being played and the user intent. The user intent of 'save object from arrows' is understood as the object has to be moved in order to save from the arrows strike. The processing engine 104 determines the change in the path of the object for satisfying the user intent. For achieving the configured path, the processing engine 104 determines the fold state configurations for the flexible display 102.

The processing engine 104 calculates a suitable voltage to control the bend sensors of the flexible display 102 according to the fold state configurations. The processing engine 104 provides the calculated voltage to the actuators of the flexible display 102 which folds the flexible display by controlling the bend sensors. Simultaneously, the processing engine 104 creates a subsequent media on the flexible display, wherein the object follows the changed path by satisfying the user intent.

Figure 12E:
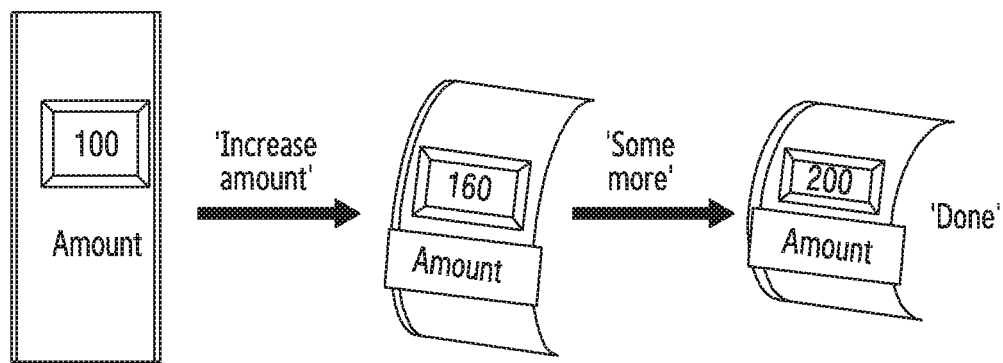

FIG. 12E illustrates an example scenario, wherein the content including an amount value (100) is initially displayed on the flexible display 102 and the user says 'increase amount'. On recognizing the user voice command, the processing engine 104 determines the user intent. In order to satisfy the user intent, the processing engine 104 folds the flexible display at the right location and alters the content by increasing the amount value (to 160) displayed on the flexible display 102. Further, the user may provide an additional input by saying "some more'. The processing engine 104 determines the user intent on recognizing the additional input and further increases the amount value (to 200) displayed on the flexible display 102. The processing engine 104 identifies that the user intent is satisfied when the user says 'done'. Thus, the user intent can be satisfied by folding the flexible display 102 and altering the content on the flexible display 102.

Figure 12F:
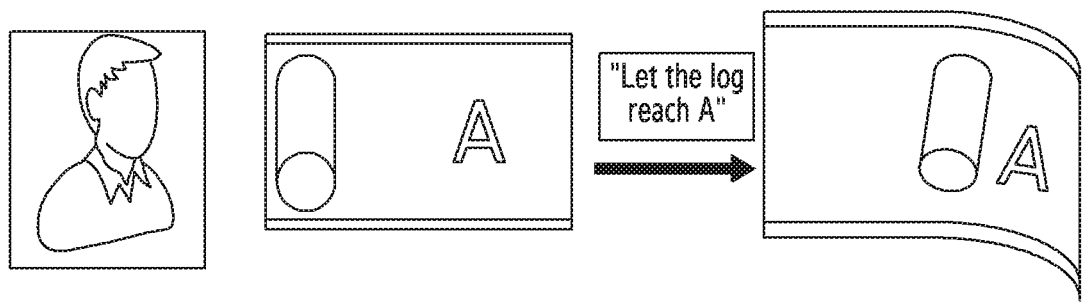

FIG. 12F illustrates an example scenario, wherein the user is playing a game on an electronic device 100 with a flexible display 102. Consider that the user says 'Let the Log reach A'. The processing engine 104 recognizes the user voice command and understands the user intent. In order to satisfy the user intent, the processing engine 104 determines the right location for folding the flexible display 102 such that movement of the log (object) can be changed to satisfy the user intent.

Figure 12G:
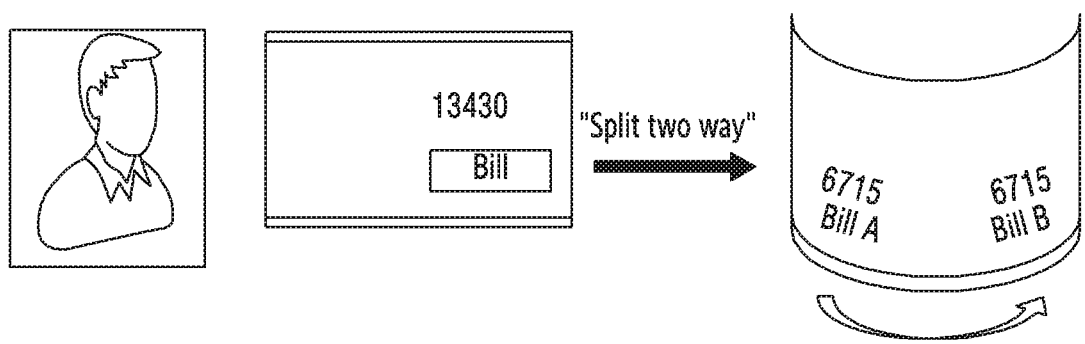

FIG. 12G illustrates an example scenario, wherein a bill is displayed on the flexible display 102 of the electronic device 100 and the user wants to split the bill in two. Consider that the user provides the voice command by saying, "split two ways". The processing engine 104 determines the user intent of splitting the bill on recognizing the voice command. For satisfying the user intent, the processing engine 104 determines the fold state configurations based on percentage of split for folding the flexible display 102 half way and updates the flexible display 102 by altering the content, wherein the content is altered by splitting the bill.

Figure 12H:
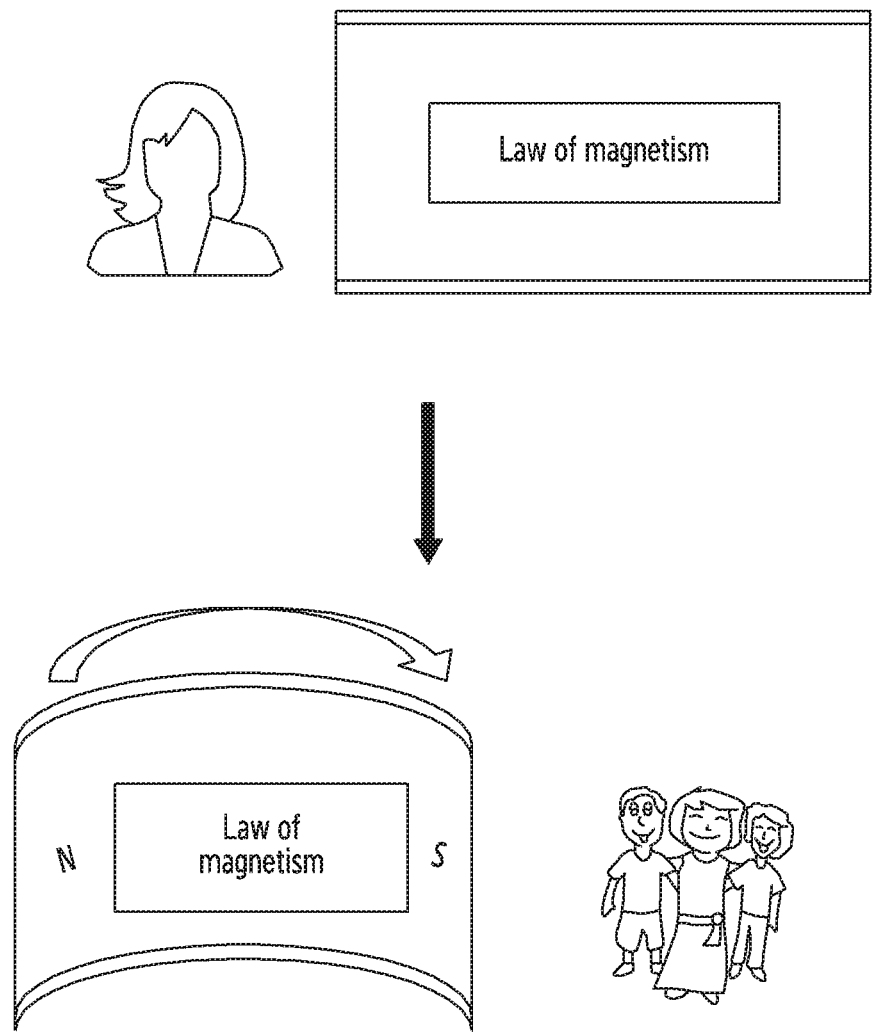

FIG. 12H illustrates an example scenario, wherein a teacher is teaching the laws of magnetism using the electronic device 100 with the flexible display 102. Consider that the teacher says "North and South attract each other". The processing engine 104 understands the teacher's intent (the user intent) of showing the magnetism where north and south attract each other. The processing engine 104 determines the right location for folding the flexible display 102 such that virtual poles (the objects) as depicted on the flexible display 102 move closer to each other physically. Thus, folding of the flexible display 102 can enable the students to learn the concept easily by seeing the physical fold.

Figure 12I:
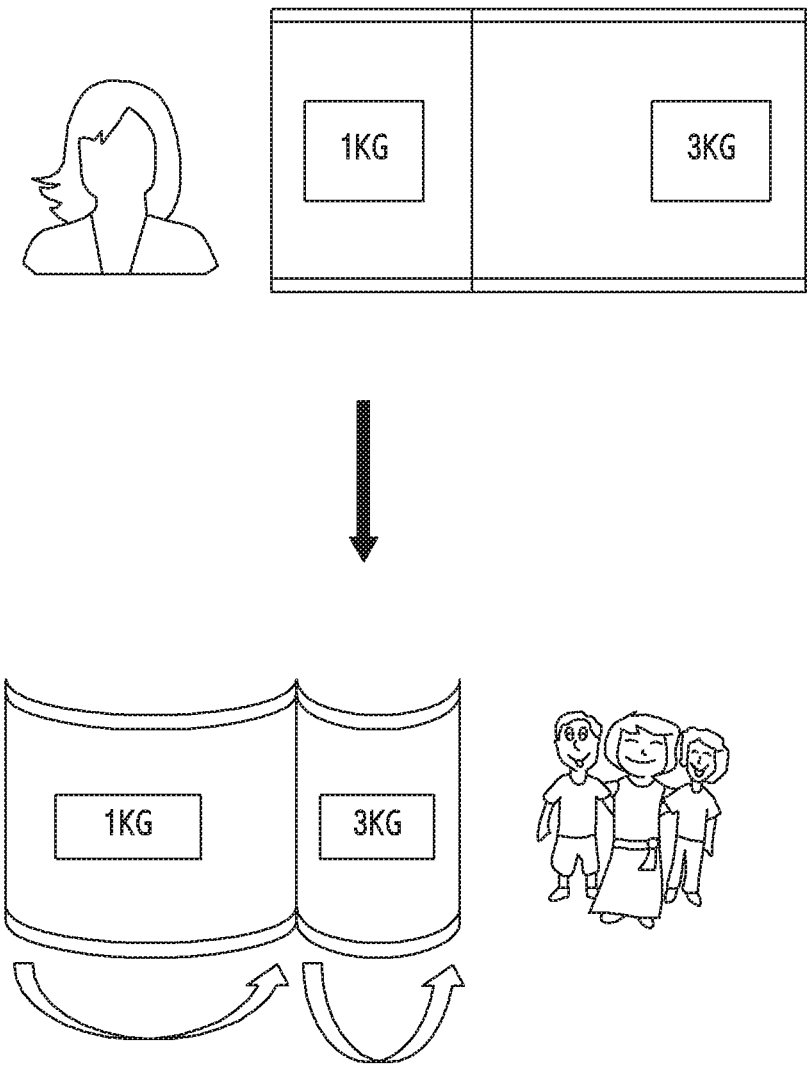

FIG. 12I illustrates an example scenario, wherein the teacher is teaching about mass of objects and comparing different masses using the electronic device 100 with the flexible display 102. Consider that the teacher says "Mass of object determines weight due to gravity". The processing engine 104 understands the teacher's intent of showing weight and determines the right location for folding the flexible display 102 so that the virtual weights of display objects are shown. This can enable the students to learn the concept easily by seeing the physical folds.

Figure 12J:
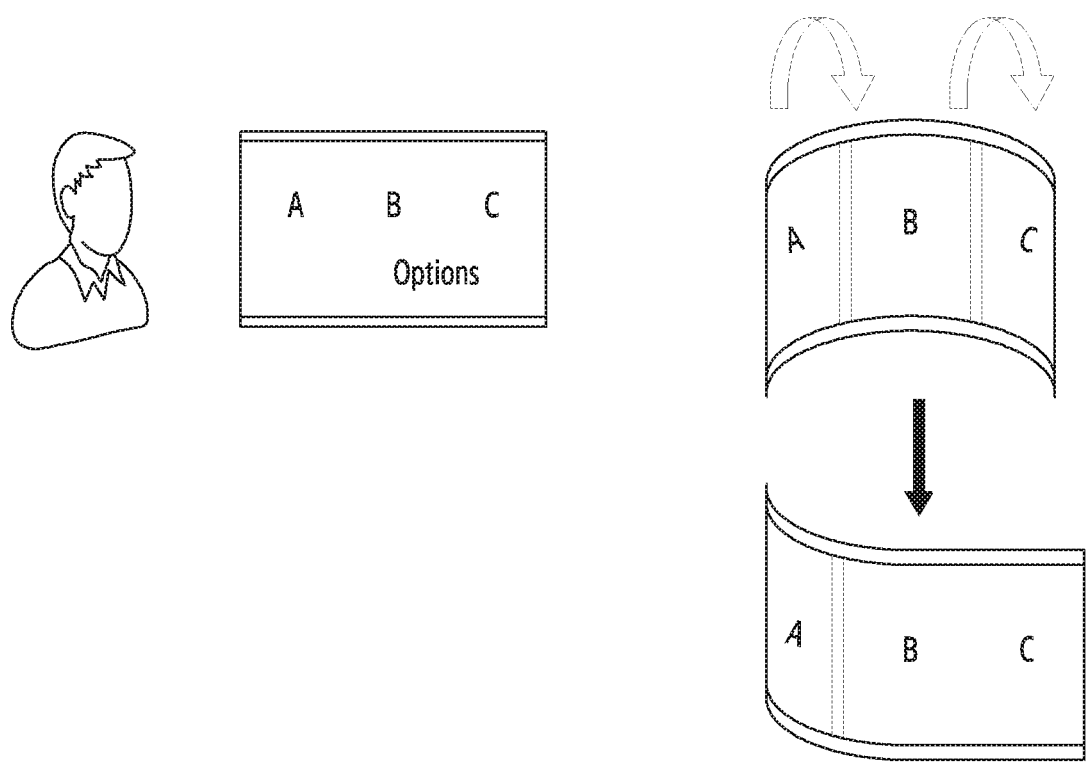

FIG. 12J illustrates an example scenario, wherein the user is viewing three business plan options on the flexible display 102 of the electronic device 100. Consider that the user says "show the best option". On recognizing the user voice commands, the processing engine 104 determines the user intent of viewing the best option in terms of benefit-cost ratio. To satisfy the user intent, the processing engine 104 determines the fold state configurations for folding the flexible display 102 so that Option B (the best option) may be highlighted with the physical screen characteristics and updates the flexible display 102 with weighing down factors. The user further says "How does it compare with last year's data?". The processing engine 104 understands the user's intent of 'comparison' along with last year's data and updates the fold state configurations and the flexible display 102.

Figure 12K:
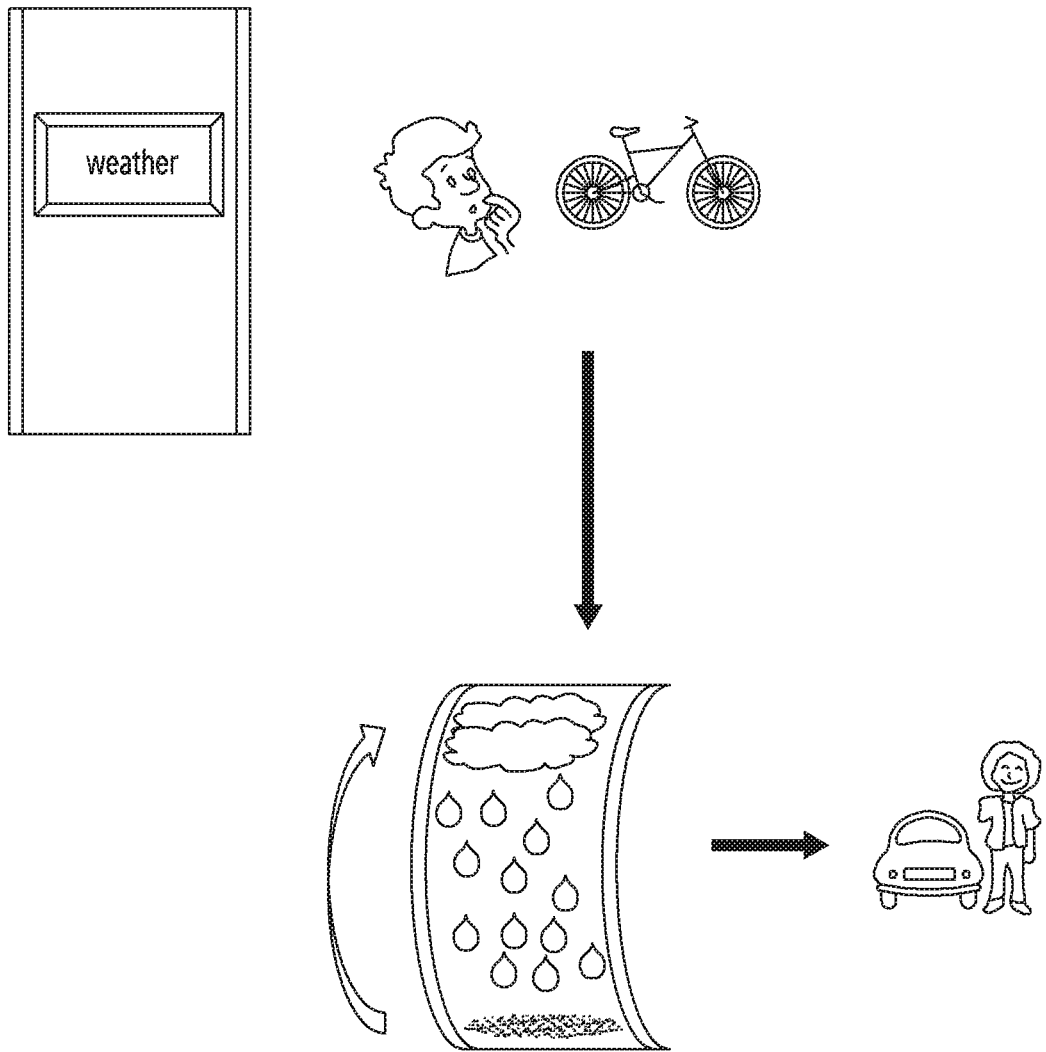

FIG. 12K illustrates an example scenario, wherein the user is having the electronic device 100 with the flexible display 102 and is with his son. The user wants to check the weather for cycling. The user says "Is weather good enough". The processing engine 104 understands the user intent of knowing if the weather is good for cycling (based on context of son's regular transport and routine). Based on the user intent, the processing engine 104 determines the fold state configurations for folding the flexible display 102. The flexible display 102 can be folded and further the processing engine 104 shows the falling of drops of water on ground (gravity implication) and how much wet the road can be. Thus, the user and his son can physically see the weather with clouds on top and wetness on the ground. In addition, the processing engine 104 may provide suggestion to the user to use any other kind of transport like cab.

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

The embodiments disclosed herein describe methods and systems for managing a flexible display of an electronic device. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g. Very high speed integrated circuit hardware description language (VHDL) another programming language, or implemented by one or more VHDL or several software modules being executed on at least one hardware device. The hardware device can be any kind of portable device that can be programmed. The device may also include means which could be e.g. hardware means like e.g. an application-specific integrated circuit (ASIC), or a combination of hardware and software means, e.g. an ASIC and a field-programmable gate array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of CPUs.

While the disclosure has been shown and described with reference to various embodiments thereof, it will be understood by those skilled in the art that various changes in form and details may be made therein without departing from the spirit and scope of the embodiments of the disclosure as defined by the appended claims and their equivalents.

What is claimed is:

1. A method for operating an electronic device, the method comprising:
   receiving an input for folding a flexible display of the electronic device;
   identifying a state of the electronic device by using at least one sensor of the electronic device;
   identifying whether the flexible display is capable of being folded according to the identified state of the electronic device and physical properties of the flexible display; and
   when identifying that the flexible display is capable of being folded, controlling to fold the flexible display.

2. The method of claim 1, further comprising:
   when identifying that the flexible display is not capable of being folded, displaying, on the flexible display, an indication for indicating that the flexible display is not capable of being folded,
   wherein the indication comprises at least one of a natural language alert or a pop-up.

3. The method of claim 1, wherein the identifying of whether the flexible display is capable of being folded comprises:
   determining a degree of freedom for indicating degrees of a folding of the flexible display based on the identified state of the electronic device, and
   identifying whether the flexible display is capable of being folded based on the degree of freedom.

4. The method of claim 1,
   wherein the controlling to fold the flexible display comprises determining a fold state configuration for the flexible display,
   wherein the determining the fold state configuration comprises:
      determining a view to be generated by a folding of the flexible display between a comfortable view and an intuitive view, and
      determining a direction of the folding and an angle of the folding for the determined view,
   wherein the intuitive view provides the folding of the electronic device configured towards an opposite side of a user, and
   wherein the comfortable view provides the folding of the electronic device configured towards the user.

5. The method of claim 1, wherein the input for folding the flexible display comprises at least one of a bending of the electronic device or a voice command.

6. The method of claim 1, wherein the state of the electronic device is identified based on at least one of a location of the electronic device, or an environment surrounding the electronic device.

7. The method of claim 1, further comprising:
   displaying a first content on the flexible display; and
   associating a user intent obtained from a voice command that is the input with an object of a second content, after detecting the input.

8. The method of claim 7,
   wherein the controlling to fold the flexible display comprises determining a fold state configuration for the flexible display,
   wherein the determining the fold state configuration comprises determining the fold state configuration comprising a number of foldable areas in the flexible display, and
   wherein the controlling to fold the flexible display comprises:
      determining a first area, a second area, and a third area in the flexible display according to the determined fold state configuration, and
      controlling to fold the flexible display based on boundaries between the first area, the second area, and the third area to each other.

9. The method of claim 7,
   wherein the flexible display comprises a first area, a second area, and a third area that is between the first area and the second area,
   wherein the flexible display is folded based on boundaries between the first area, the second area, and the third area to each other, and
   wherein displaying the first content on the folded flexible display comprises displaying the first content on the first area and the second area and displaying the second content on the third area.

10. The method of claim 7, wherein the second content comprises at least one of a news ticker, a reminder associated with edge display functions, or a weather update.

11. An electronic device comprising:
   at least one sensor;
   a flexible display; and
   at least one processor,
   wherein the at least one processor is configured to:
      receive an input for folding a flexible display of the electronic device,
      identify a state of the electronic device by using the at least one sensor,
      identify whether the flexible display is capable of being folded according to the identified state of the electronic device and the physical properties of the flexible display, and
      when identifying that the flexible display is capable of being folded, control to fold the flexible display.

12. The electronic device of claim 11,
   wherein the at least one processor is further configured to:
      when identifying that the flexible display is not capable of being folded, display, on the flexible display, an indication for indicating that the flexible display is not capable of being folded, and
   wherein the indication comprises at least one of a natural language alert or a pop-up.

13. The electronic device of claim 11, wherein, in order to identify whether the flexible display is capable of being folded, the at least one processor is further configured to:

determine a degree of freedom for indicating degrees of a folding of the flexible display based on the identified state of the electronic device, and identify that the flexible display is capable of being folded based on the degree of freedom.

14. The electronic device of claim 11, wherein, in order to control to fold the flexible display, the at least one processor is further configured to determine a fold state configuration, wherein, in order to determine the fold state configuration, the at least one processor is further configured to:

determine a view to be generated by a folding of the flexible display between a comfortable view and an intuitive view, and determine a direction of the folding and an angle of the folding for the determined view, wherein the intuitive view provides the folding of the electronic device configured towards an opposite side of a user, and wherein the comfortable view provides the folding of the electronic device configured towards the user.

15. The electronic device of claim 11, wherein the input for folding the flexible display comprises at least one of a bending of the electronic device or a voice command.

16. The electronic device of claim 11, wherein the state of the electronic device is identified based on at least one of a location of the electronic device, or an environment surrounding the electronic device.

17. The electronic device of claim 11, wherein the at least one processor is further configured to:

display a first content on the flexible display, and associate a user intent obtained from a voice command that is the input with an object of a second content, after detecting the input.

18. The electronic device of claim 17, wherein, in order to control to fold the flexible display, the at least one processor is further configured to determine a fold state configuration, wherein, in order to determine the fold state configuration, the at least one processor is further configured to determine the fold state configuration comprising a number of foldable areas in the flexible display, and wherein, in order to control to fold the flexible display, the at least one processor is further configured to:

determine a first area, a second area, and a third area in the flexible display according to the determined fold state configuration, and control to fold the flexible display based on boundaries between the first area, the second area, and the third area to each other.

19. The electronic device of claim 17, wherein the flexible display comprises a first area, a second area, and a third area that is between the first area and the second area, wherein the flexible display is folded based on boundaries between the first area, the second area, and the third area to each other, and wherein, in order to display the first content on the folded flexible display, the at least one processor is further configured to display the first content on the first area and the second area and displaying the second content on the third area.

20. The electronic device of claim 17, wherein the second content comprises at least one of a news ticker, a reminder associated with edge display functions, or a weather update.

* * * * *